(12) United States Patent
Srinivasan et al.

(10) Patent No.: US 9,132,364 B2
(45) Date of Patent: Sep. 15, 2015

(54) HIGH CAPACITY ION CHROMATOGRAPHY STATIONARY PHASES AND METHOD OF FORMING

(75) Inventors: Kannan Srinivasan, Tracy, CA (US); Christopher A. Pohl, Union City, CA (US); Sheetal Bhardwaj, Fremont, CA (US); Rong Lin, Sunnyvale, CA (US)

(73) Assignee: Dionex Corporation, Sunnyvale, CA (US)

( * ) Notice: Subject to any disclaimer, the term of this patent is extended or adjusted under 35 U.S.C. 154(b) by 1154 days.

(21) Appl. No.: 12/714,253

(22) Filed: Feb. 26, 2010

(65) Prior Publication Data

US 2011/0210055 A1    Sep. 1, 2011

(51) Int. Cl.
| | |
|---|---|
| *B01D 15/36* | (2006.01) |
| *B01J 39/26* | (2006.01) |
| *B01J 41/04* | (2006.01) |
| *B01J 41/20* | (2006.01) |
| *B01J 47/00* | (2006.01) |

(52) U.S. Cl.
CPC ............... *B01D 15/36* (2013.01); *B01J 39/26* (2013.01); *B01J 41/04* (2013.01); *B01J 41/20* (2013.01); *B01J 47/00* (2013.01); *B01D 15/361* (2013.01)

(58) Field of Classification Search
CPC ....... B01D 15/36; B01D 15/361; B01J 47/00; B01J 41/04; B01J 41/20; B01J 39/26
USPC ................... 210/635, 638, 656, 198.2, 502.1; 521/25, 30, 34
See application file for complete search history.

(56) References Cited

U.S. PATENT DOCUMENTS

| | | | | |
|---|---|---|---|---|
| 2,927,022 | A | | 3/1960 | Martin et al. |
| 3,380,831 | A | | 4/1968 | Cohen et al. |
| 3,808,125 | A | * | 4/1974 | Good ........................... 73/23.39 |
| 3,878,092 | A | * | 4/1975 | Fuller ......................... 210/198.2 |
| 4,101,460 | A | | 7/1978 | Small et al. |
| 4,680,201 | A | * | 7/1987 | Hjerten .......................... 204/601 |
| 5,030,352 | A | * | 7/1991 | Varady et al. .............. 210/502.1 |
| 5,268,097 | A | * | 12/1993 | Girot et al. ................. 210/198.2 |
| 5,532,279 | A | | 7/1996 | Barretto et al. |
| 6,039,876 | A | * | 3/2000 | Yang ............................. 210/635 |
| 6,074,541 | A | | 6/2000 | Srinivasan et al. |
| 7,291,395 | B2 | | 11/2007 | Pohl et al. |
| 8,101,073 | B2 | * | 1/2012 | Wada et al. ................ 210/198.2 |
| 2005/0181224 | A1 | | 8/2005 | Pohl et al. |
| 2006/0043022 | A1 | * | 3/2006 | Wada et al. .................... 210/656 |
| 2007/0062854 | A1 | | 3/2007 | Pohl et al. |

\* cited by examiner

*Primary Examiner* — Ernest G Therkorn
(74) *Attorney, Agent, or Firm* — Gregory C. Ellis

(57) ABSTRACT

The present invention provides a new design for high capacity stationary phases for chromatography, for example, ion chromatography. The stationary phases include a first polymer layer in contact with and at least partially coating the substrate of the stationary phase. The first polymer layer serves as a foundation for the attachment, and in various embodiments, the growth and attachment, of a highly hyperbranched polymer structure, typically based on one or more products of condensation polymerization. Multiple components are of use in forming the first polymer layer and the hyperbranched polymer structure, thereby providing a stationary phase that can be engineered to have a desired property such as ion capacity, ion selectivity, and the like. Exemplary condensation polymers are formed by the reaction of at least one polyfunctional compound with at least one compound of complimentary reactivity, e.g., a nucleophilic polyfunctional compound reacting with an electrophilic compound.

19 Claims, 9 Drawing Sheets

HIGH CAPACITY ION CHROMATOGRAPHY STATIONARY PHASES AND METHOD OF FORMING

BACKGROUND OF THE INVENTION

The present invention relates to a coated ion exchange material suitable for use in chromatography medium, and a method of forming this material.

In one form of liquid chromatography, columns are packed with a discrete organic polymer granule or particle medium having functionally active surfaces. Materials for performing liquid chromatography are known where only thin outer surfaces of the chromatographic support materials are available for active exchange of ions with liquid media. For example, Small, et al. U.S. Pat. No. 4,101,460 describes an ion exchange composition comprising Component A, an insoluble synthetic resin substrate having ion-exchanging sites on its available surface, and Component B, a finely divided insoluble material, irreversibly attached thereto by electrostatic forces. Component B is typically deposited onto Component A from a latex.

A disadvantage regarding the latex coating procedure is that it can take a substantial period of time, e.g., days or even weeks, to make an optimized packed column. Such procedures typically require applying the coating after the column is packed which increases the manufacturing time and labor compared to synthetic methods which can provide a finished product prior to packing. This is because the packing can be made more efficiently in large batches rather than on a column-by-column basis. Also, latex synthesis is generally limited to water insoluble monomers, significantly limiting the choice of available monomers.

Other particulate bed materials with ion exchange layering particles irreversibly bound to the outer surface of support particles are described in Barretto, U.S. Pat. No. 5,532,279. In one embodiment, Barretto describes forming a complex by contacting a suitable dispersant with monomer in an aqueous solution in which the monomer is insoluble. Under suitable conditions for suspension polymerization, the monomer will polymerize to form resin support particles having a dispersant irreversibly attached to those particles. Fine synthetic layering particles are bound to the support particles. A number of other embodiments are disclosed for irreversible attachment.

Another form of ion chromatographic medium is made by forming a coating by binding a solution of a preformed polymer with saturated carbon chain backbones including leaving groups under hydrogen abstraction conditions to bind to preformed polymer to a substrate in the presence of a free-radical catalyst which removes leaving groups from the carbon chain to form the covalent bonds. See Srinivasan, U.S. Pat. No. 6,074,541. This coating is disclosed for use with a variety of substrates including the inner wall of a conduit or particles for use in a packed bed.

A significant application of ion chromatography is in analyzing water, e.g., surface water and well water. Worldwide, municipal facilities use ion chromatography to qualify water as being appropriate for human consumption. The ionic content of water varies significantly depending on the source, storage and handling conditions. In samples containing high levels of matrix ions such as chloride, sulfate and bicarbonate detecting trace amounts of ions such as bromate or chlorite or perchlorate is challenging.

Methods for ion analysis of water include direct injection and analysis, or pretreating the samples prior to a direct injection analysis. Direct injection is preferred, however, application of this method is limited for some samples with high matrix content due to the limited capacity of the stationary phases currently available. An alternate approach is to pursue pre-concentration of the ions in the sample in conjunction with heart cutting or some means of removing the matrix ions prior to analysis. Heart cutting methods are two-dimensional methods in which the matrix ions are separated or removed in the first dimension, enabling analysis of the ions of interest. Matrix ions are also removed using sample pretreatment with one or more pretreatment cartridges. For example a barium form cation exchange resin based cartridge is used to remove sulfate from the sample matrix. The methods discussed above are multi-step processes with multiple valve configurations, complex plumbing or are labor intensive. Therefore it is desirable to simplify the analysis protocol for samples containing matrix ions. Ion exchange phases having unique enhanced capacity architecture will facilitate analysis.

To counter some of the limitations of existing stationary phases a new phase and method of making this phase was recently introduced (U.S. Pat. No. 7,291,395). The method and phase rely on an amine epoxide-based chemistry to grow a hydrophilic hyperbranched structure on top of the substrate of the ion exchange phase. This type of structure does not have the limitation of inter-penetrating polymers of the prior art phases and shows excellent efficiencies. The capacity of these phases, however, could be enhanced to facilitate direct injection of samples with high matrix ion concentration.

High capacity ion exchange phases should provide high resolution of species of interest, particularly over matrix ions, and the ability to handle high matrix ion concentrations without over-loading the stationary phase. These phases should also allow quantitation at trace levels of ions other than matrix ions and have unique selectivity to facilitate separation of species of interest. Furthermore, a desirable ion exchange material will be resistant to binding matrix ions, preventing these ions from interacting with the stationary phase and decreasing available capacity of this phase. The present invention provides such high capacity stationary phases and methods of making and using them.

SUMMARY OF THE INVENTION

The present invention provides a new design for high capacity stationary phases for chromatography, for example, ion chromatography. The stationary phases include a first polymer layer in contact with and at least partially coating the substrate of the stationary phase. The first polymer layer serves as a foundation for the attachment, and in various embodiments, the growth and attachment, of a highly hyperbranched polymer structure, typically based on one or more products of condensation polymerization. Multiple components are of use in forming the first polymer layer and the hyperbranched polymer structure, thereby providing a stationary phase that can be engineered to have a desired property such as ion capacity, ion selectivity, and the like. Exemplary condensation polymers are formed by the reaction of at least one polyfunctional compound with at least one compound of complimentary reactivity, e.g., a nucleophilic polyfunctional compound reacting with an electrophilic compound.

In an exemplary embodiment, the first polymer layer includes reactive functional groups that are accessible to an incoming reactive monomer or polymer, which reacts with the functional groups becoming attached to the first polymer layer. The reactive monomer or polymer bears a reactive functional group that is of reactivity complimentary to that of the reactive functional group on the first polymer layer. For example, when the first polymer layer includes vinylic reactive groups (e.g., when the first polymer layer is a styrenic layer), the incoming monomer or polymer bears a reactive functional group that is reactive with the vinylic moieties of the styrenic layer. An exemplary reactive functional group on the incoming monomer or polymer is a vinylic double bond. When the first monomer or polymer is attached to the first polymer layer, this layer can be further elaborated. In various embodiments, the layer attached to the first polymer layer is elaborated by the use of condensation polymerization.

The present invention provides numerous advantages. For example hydrolytically stable ion exchange materials can be readily formed on a wide variety of substrates. Moreover, the hydrophilic nature of the condensation polymers formed over the first polymer layer are ideally suited for the separation of ions, providing excellent resolution of bromate from chloride as well as excellent resolution of both bromide and chlorate from nitrate. Condensation polymers can be formed from a wide variety of commercially available reagents to enable the preparation of materials of optimal selectivity for specific separation requirements. The first polymer layer and subsequent condensation polymer layers can be applied to a substrate after a column is packed with the substrate, facilitating rapid screening of suitable coating chemistries. Furthermore, coatings can also be applied to the substrate under slurry conditions or in packed beds in order to provide suitable synthesis scale for large-scale production, minimizing manufacturing cost. The coating process can be interrupted at any stage in the reaction process for testing without interfering with the reaction process. The coating process can then be resumed based on intermediate test data. In various embodiments in which the condensation polymer coating is based on epoxide chemistry, as well as closely related analogues produced from polyfunctional epoxides and polyfunctional amines, the reaction product is UV transparent making it suitable for direct detection of analytes within the stationary phase provided the material is applied to a suitable UV transparent substrate. Additionally, attaching the condensation polymer to a substrate coated with a first polymer layer it is now possible not only to achieve the improved chromatographic performance previously only achievable using latex coated substrates but to significantly increase the capacity of the resulting ion-exchange material. These improvements come without sacrificing the benefits of batch synthesis previously only available using graft polymerization. The ion exchange medium synthesis method of the invention produces an ion exchange medium with an unexpectedly high ion capacity.

In an exemplary embodiment, following the attachment or synthesis and attachment of the first polymer layer on the substrate, the resulting coated substrate is modified by the attachment or growth and attachment of one or more condensation polymerization products on the coated substrate. In various embodiments, the condensation products are based on the amine epoxide chemistry described in U.S. Pat. No. 7,291,395 to create a highly hyperbranched structure on top of the first polymer layer on the substrate. Multiple anchor points on the organic polymer chains of the first polymer layer serve to attach the condensation polymer to the substrate. The net result is a highly hyperbranched structure that, in an exemplary embodiment, extends uniformly on the surface of the phase and provides excellent coverage of the substrate and first polymer layer surface.

Due to the unique stationary phase architecture of the present invention, in which the first polymer layer provides many points for anchoring the hyperbranched structures grown on the first polymer layer, the solid phases are densely covered with a hyperbranched structure. Furthermore, in the stationary phases of the present invention the anchoring points for the highly branched structure is moved away from the surface of the substrate itself by interposing the first polymer layer between the substrate surface and the highly branched structure.

The method comprises, (a) attaching a first polymer layer to the substrate by a method which is a member selected from the group of, (i) polymerizing at least a first polymerizable monomer, having a functional group which is a member selected from a reactive functional group and a charged functional group, in contact with the substrate; and (ii) attaching an intact polymer having a functional group which is a member selected from a reactive functional group and a charged functional group, thereby forming a first polymer layer bearing a reactive or charged functional group, which is attached to the substrate. Also included in the method is, (b) reacting a compound which is a member selected from: (i) at least a first amine compound, comprising a reactive nitrogen group, which is a member selected from the group consisting of ammonia, a primary and a secondary amine; (ii) at least a first polyfunctional compound, having at least two functional moieties reactive with the nitrogen groups; and (iii) a combination thereof in the presence of the first polymer layer coated substrate to form a first condensation polymer reaction product. The condensation reaction product is attached to the first polymer layer and includes a member selected from a reactive nitrogen group, a reactive functional group derived from a polyfunctional compound and a combination thereof.

Another embodiment of the present invention is a stationary phase for ion chromatography. Exemplary stationary phases are prepared by a method of the invention. An example of this embodiment is based upon a substrate that is coated with a first polymer in contact with the substrate. This first polymer serves as an anchor for a condensation polymer layer comprising at least a first and second condensation polymer reaction product. The first reaction product is attached to the polymer coating in contact with the substrate and comprises a first condensation polymer reaction product of at least a first amine compound, comprising amine groups selected from the group consisting of ammonia, a primary and a secondary amine, and at least a first polyfunctional compound with at least two functional moieties reactive with the amine groups, and the second condensation polymer reaction product comprising the reaction product of either the at least first amine compound or the at least first polyfunctional compound with at least a second amine compound or second polyfunctional compound.

Other embodiments, objects and advantages of the invention are apparent from the detailed description that follows.

DETAILED DESCRIPTION OF THE PREFERRED EMBODIMENTS

Figure 1:
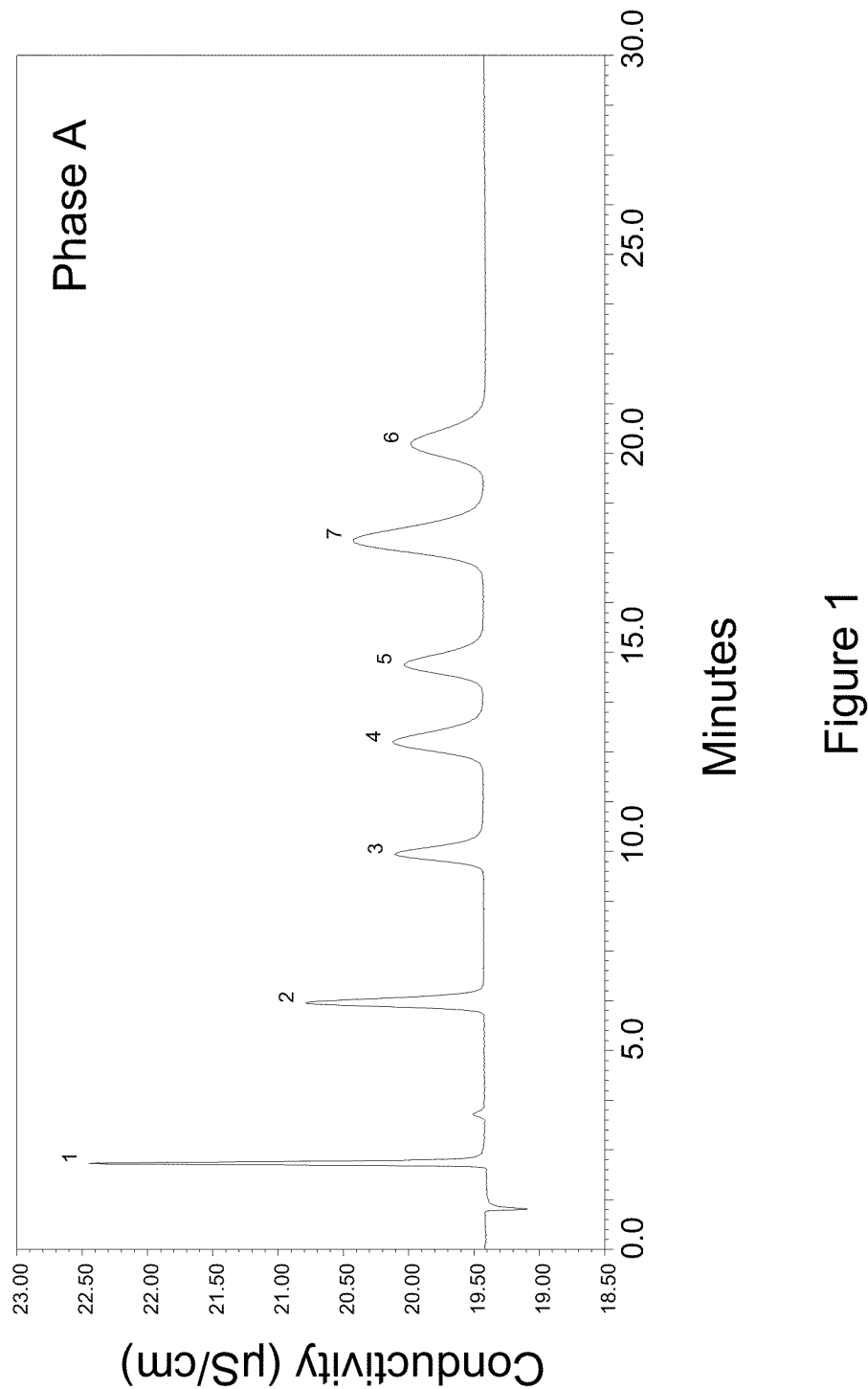
FIG. 1 is a chromatogram showing the ion chromatographic analysis of a mixture of seven anions using a wide pore stationary phase of the present invention.

In accordance with one embodiment of the present invention, there is provided a method for making an ion exchange coating (e.g., a chromatographic medium) on a substrate presenting a first polymer layer. The method comprises, (a) attaching a first polymer layer to the substrate by a method which is a member selected from the group of, (i) polymerizing at least a first polymerizable monomer, having a functional group which is a member selected from a reactive functional group and a charged functional group, in contact with the substrate; and (ii) attaching an intact polymer having a functional group which is a member selected from a reactive functional group and a charged functional group, thereby forming a first polymer layer bearing a reactive or charged functional group, which is attached to the substrate. Also included in the method is, (b) reacting a compound which is a member selected from: (i) at least a first amine compound, comprising a reactive nitrogen group, which is a member selected from the group consisting of ammonia, a primary and a secondary amine; (ii) at least a first polyfunctional compound, having at least two functional moieties reactive with the nitrogen groups; and (iii) a combination thereof in the presence of the first polymer layer coated substrate to form a first condensation polymer reaction product. The condensation reaction product is attached to the first polymer layer and includes a member selected from a reactive nitrogen group, a reactive functional group derived from a polyfunctional compound and a combination thereof.

In another exemplary embodiment, the invention provides a method for making a substrate supported ion exchange medium. The method includes step (a) as set forth above and (b) reacting with the functional group an intact polymer comprising a polymer reactive functional moiety capable of reacting with said functional group, thereby attaching the intact polymer to said polymer coated substrate. In various embodiments, the intact polymer is a condensation polymer formed by reaction of a polyfunctional epoxide monomer and an amine monomer, e.g., 1,4-butanedioldiglycidylether and methylamine.

In an exemplary embodiment, the first polymer layer includes reactive functional groups that are accessible to an incoming reactive monomer or polymer, which reacts with the functional groups becoming attached to the first polymer layer. The reactive monomer or polymer bears a reactive functional group that is of reactivity complimentary to that of the reactive functional group on the first polymer layer. For example, when the first polymer layer includes vinylic reactive groups (e.g., when the first polymer layer is an acryloyl layer), the incoming monomer or polymer bears a reactive functional group that is reactive with the vinylic moieties of the acryloyl layer. An exemplary reactive functional group on the incoming monomer or polymer is a vinylic double bond. When the first monomer or polymer is attached to the first polymer layer, the resulting "second" layer can be further elaborated. In various embodiments, the layer attached to the first polymer layer is elaborated by the use of condensation polymerization.

In various embodiments making use of condensation polymerization to elaborate the first polymer or the layer attached to the first polymer layer, the elaboration is through the reaction of a monomer or polymer bearing a reactive nitrogen group and a nitrogen-reactive polyfunctional compound, each of which may itself be monomeric or polymeric.

In one example, the reactive nitrogen-containing compound and the polyfunctional compound are combined with the substrate bearing the first polymer layer (or a "second" or higher order layer on the first polymer layer). The reaction proceeds under condensation polymerization conditions to provide at least a first layer of condensation polymer on the first polymer layer or the layer attached to the first polymer layer. For example, an amine with a reactive nitrogen atom and a diepoxide are combined with the substrate under condensation polymerization conditions and a condensation polymer layer is set down on the first polymer layer attached to the substrate.

In various embodiments, the substrate with the first polymer layer is contacted with the individual reactants in the condensation polymerization cycle. Thus, in one embodiment, the layer on the first polymer layer bears reactive nitrogen functional groups. This reactive substrate is reacted with a polyfunctional compound reactive with the reactive nitrogen functional groups under condensation polymerization conditions to form a condensation polymer. Similarly, the layer on the first polymer layer having a polyfunctional compound (or reactive functional groups derived from a polyfunctional compound) can be reacted with a reactive nitrogen moiety under condensation polymerization conditions to form a layer of condensation polymer.

As used herein, the term "reactive nitrogen" refers to a nitrogen atom possessing at least one open (excess) valence allowing its reaction with a reactive functional group such as a group on a polyfunctional compound or a reactive functional group derived from a polyfunctional compound. An exemplary use of the term is in connection with an incoming nitrogen-containing amine reactant in a condensation polymerization reaction. The term is also used in reference to a nitrogen atom that is a component of a polymer layer of the stationary phase of the invention. Thus, in the case of methyl amine after it has reacted with a reactive functional group of a polyfunctional compound to become a secondary amine, the nitrogen atom is referred to as a "reactive nitrogen" atom. After further reaction of the secondary amine with a reactive functional group to form a tertiary amine, the nitrogen atom is referred to as a "reactive nitrogen" atom. After a third reaction cycle when the nitrogen atom is quaternized, it is no longer referred to as a "reactive nitrogen" atom. Those of skill will appreciate a similar discussion is applicable when the reactive nitrogen atom is derived from ammonia, a primary, secondary or tertiary amine.

The term "polyfunctional compound" refers to any compound having more than one reactive functional group. Exemplary polyfunctional compounds include two or more reactive functional group linked through a substituted or unsubstituted alkyl or heteroalkyl linking moiety. Exemplary linking moieties include those with from 1-20 carbon atoms and optionally contain from 0-12 heteroatoms. Exemplary linking moieties include those having 1, 2, 3, 4, 5, 6, 7, 8, 9, 10, 11, 12 or more carbon atoms. Reactive functional groups on a polyfunctional compound are referred to herein as "polyfunctional compound reactive functional groups."

The term "reactive functional group derived from a polyfunctional compound" refers to reactive functional groups of a polyfunctional compound that has been through at least one condensation polymerization cycle; however, the reactive functional group derived from a polyfunctional compound is not reacted in this particular reaction cycle, and remains reactive. Thus, in the case of a diepoxide, if one of the epoxide groups remains unreacted after a reaction cycle with, for instance, an amine moiety, the unreacted epoxide is referred to as a "reactive functional group derived from a polyfunctional compound." Those of skill will appreciate that a similar discussion is applicable when the polyfunctional compound includes more than two reactive functional groups and or includes functional groups that are not epoxides. Thus, for example, the discussion is relevant to diamines, triamines, dicarboxylic acids, tricarboxylic acids, triepoxides, etc.

Thus, in an exemplary embodiment, the invention provides for a method of forming a polymer coated substrate by reacting a substrate coated with a first polymer layer with a member selected from a monomer and a polymer having a functional group which is a member selected from a reactive functional group and a charged functional group. The method includes contacting the substrate with the first polymer layer with the monomer or the polymer under conditions appropriate to attach the polymer to the first polymer layer or to polymerize the monomer, thereby attaching it to the first polymer layer.

In various embodiments, the method further comprises, (c) reacting the first condensation polymer reaction product with a member selected from, (i) a second amine compound comprising a second reactive nitrogen group which is a member selected from the group consisting of ammonia, a primary, a secondary, and a tertiary amine when a reactive functional group derived from a polyfunctional compound is present in the first condensation polymer product, and (ii) a second polyfunctional compound, having at least two second reactive functional groups reactive with the first nitrogen group when the first reactive nitrogen group is present in the first condensation polymer, thereby forming a second condensation polymer reaction product. As will be appreciated, this step is relevant to embodiments in which step (b) involves formation of a polymer in situ or attachment of an intact polymer.

At each step in which a condensation polymer is formed one or more of a reactive amine group and a reactive functional group derived from a polyfunctional compound is present in said condensation polymer. In various embodiments, these groups are present on the "exterior" or "surface" of the substrate. As used herein, the terms "exterior" and "surface" have their normal meanings and also include an operational definition: the groups are accessible to an incoming reactant such as an amine, a polyfunctional compound or other compound.

The polymer coating on the surface of the substrate can be a hydrophilic or hydrophobic polymer. Suitable polymers for the organic polymer layer include, without limitation substituted or unsubstituted polymers or copolymers of polyalkylenes, polyesters, polyamines, polyamides, polyethers, polysulfonates, polyoxides, polyalkyleneglycols, polystyrenic based polymers, polyacetals, polychlorides, polysaccharides, polycarbonates, polymers of monoethylenically unsaturated monomers, polymers of polyvinylidene monomers and mixtures and copolymers of the above polymers.

In various embodiments, the first polymer layer is hydrophilic and has functional groups that are polar or charged, rendering the polymer soluble in, or capable of absorbing water. The polymers are chosen such that they allow for anchor sites via electrostatic bonding such as anionic carboxylate sites in polyacrylic acid or allow reactive sites (e.g., reactive functional groups) for reacting with amines, epoxides or other reactive species as the case may be. For example reactive sites bearing a halogen or other leaving group (e.g., chloride in vinyl benzyl chloride) can be reacted with amines, or carboxyl groups in polyacrylic acid can be reacted with epoxides and further modified per the present invention.

Exemplary polymers include, without limitation, alginates, alkyl- and hydroxyalkyl-celluloses, carboxymethyl cellulose and its salts, carrageenan, cellulose and its derivatives, gelatin, gellan, guar gum, gum arabic, maleic acid copolymers, methacrylic acid copolymers, methyl vinyl ether/maleic anhydride copolymers, pectins, polyacrylamide, poly(acrylic acid) and its salts, poly(ethylene glycol), poly(ethylene oxide-co-propylene oxide), poly(ethylene imine), poly(ethylene oxide), poly(propylene oxide), hyaluronic acid, poly(2-hydroxyethyl methacrylate), heparin, polyvinyl pyrrolidone), chondroitan sulfate, chitosan, glucosaminoglucans, dextran, dextrin, dextran sulfate, cellulose acetate, carboxymethyl cellulose, hydroxyethyl cellulose, cellulosics, poly(trimethylene glycol), poly(tetramethylene glycol), polypeptides, polyacrylamide, polyacrylamide, poly(ethylene amine), poly(allyl amine), poly(methacrylic acid), polystyrene and sulfonated polystyrene, poly(vinyl acetate), poly(vinyl alcohol), poly(vinyl amine), poly(vinyl pyrrolidone), polyvinyl sulfonic acid), starches and their derivatives, styrene maleic anhydride copolymers, crotonic acid copolymers, xanthan gum, and the derivatives and copolymers thereof.

As set forth hereinabove, the stationary phase of the invention can be assembled by attachment of one or more fully formed polymer layers to the substrate coated with a first polymer layer. The list above is a non-exclusive list of fully formed polymers that may be used in such an attachment strategy. As will be appreciated by those of skill in the art, each of the recited polymers may also be formed from one or monomer in the method of the invention and attached during its formation. Exemplary monomers of use to form the fully formed polymer layer(s) are set forth below.

Exemplary monomers of use to form the polymer coating on the substrate (or for attachment to the coated substrate) include, without limitation, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylates, acrylates and styrenes selected from glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N—N-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), alpha-methylvinyl benzoic acid (all isomers), diethylamino alpha-methylstyrene (all isomers), p-vinylbenzene sulfonic acid, p-vinylbenzene sulfonic salts, trimethoxysilylpropyl methacrylate, triethoxysilylpropyl methacrylate, tributoxysilylpropyl methacrylate, dimethoxymethylsilylpropyl methacrylate, diethoxymethyl-silylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, isoprene, chloroprene, ethylene, propylene.

Polymers of use in the invention include homopolymers of the monomers, as well as copolymerization of mixtures of monomers. Those skilled in the art are familiar with other monomers that can be used to prepare polymers, and which are useful in the first polymer coating component of the invention.

In an exemplary embodiment, the first polymer layer is a homopolymer formed from a single monomer. In various exemplary embodiments, the polymer is not a condensation polymer formed between two or more different reactants. In various embodiments, the first polymer layer is a polymer other than one formed by the condensation polymerization of a polyfunctional compound and an amine. In exemplary embodiments, the first polymer layer is a polymer other than one formed by the condensation polymerization of a diepoxide and an amine. In still further exemplary embodiments, the first polymer layer is a polymer that is not formed by the condensation polymerization of 1,4-butanediol diepoxide and methylamine.

In various embodiments, the first polymer layer is formed from a monomer that includes a reactive or charged functional group other than the functional group through which the polymerization occurs (e.g., other than the vinylic double bond). Reactive groups and classes of reactions useful in practicing the present invention are generally those that are well known in the art of bioconjugate chemistry. Currently favored classes of reactions available with reactive tubulysin analogues are those, which proceed under relatively mild conditions. These include, but are not limited to nucleophilic substitutions (e.g., reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, Smith and March, ADVANCED ORGANIC CHEMISTRY, 5th Ed., John Wiley & Sons, New York, 2001; Hermanson, BIOCONJUGATE TECHNIQUES, Academic Press, San Diego, 1996; and Feeney et al., MODIFICATION OF PROTEINS; Advances in Chemistry Series, Vol. 198, American Chemical Society, Washington, D.C., 1982.

A useful reactive functional group (also referred to as "a reactive functional moiety") on a polymerizable monomer, the first polymer layer, a condensation polymer, a polyfunctional compound or other component of the ion exchange medium of the invention or of use in a method to make this medium includes, but is not limited to:

(a) carboxyl groups and various derivatives thereof including, but not limited to, active esters, e.g., N-hydroxysuccinimide esters, N-hydroxybenzotriazole esters, thioesters, p-nitrophenyl esters, alkyl, alkenyl, alkynyl, aromatic esters, acid halides, and acyl imidazoles;

(b) hydroxyl groups, which can be converted to, e.g., esters, ethers, aldehydes, etc.

(c) haloalkyl groups, wherein the halide can be later displaced with a nucleophilic group such as, for example, an amine, a carboxylate anion, thiol anion, carbanion, or an alkoxide ion, thereby resulting in the covalent attachment of a new group at the functional group of the halogen atom;

(d) dienophile groups, which are capable of participating in Diels-Alder reactions such as, for example, maleimido groups;

(e) aldehyde or ketone groups, such that subsequent derivatization is possible via formation of carbonyl derivatives such as, for example, imines, hydrazones, semicarbazones or oximes, or via such mechanisms as Grignard addition or alkyllithium addition;

(f) sulfonyl halide groups for subsequent reaction with amines, for example, to form sulfonamides;

(g) thiol groups, which can be, for example, converted to disulfides or reacted with alkyl and acyl halides;

(h) amine or sulfhydryl groups, which can be, for example, acylated, alkylated or oxidized;

(i) alkenes, which can undergo, for example, cycloadditions, acylation, Michael addition, etc; and (j) epoxides, which can react with, for example, amines and hydroxyl compounds.

Exemplary functional groups of use in various embodiments include carboxylate, sulfonate, iminodiacetate, amine, halide hydroxyl, epoxide and a combination thereof.

The reactive and charged functional groups can be chosen such that they do not participate in, or interfere with, the reactions necessary to assemble the first polymer layer. Alternatively, a reactive or charged functional group can be protected from participating in the reaction by the presence of a protecting group. Those of skill in the art understand how to protect a particular functional group such that it does not interfere with a chosen set of reaction conditions. For examples of useful protecting groups, see, for example, Greene et al., PROTECTIVE GROUPS IN ORGANIC SYNTHESIS, John Wiley & Sons, New York, 1991.

"Protecting group," as used herein refers to a portion of a substrate that is substantially stable under a particular reaction condition, but which is cleaved from the substrate under a different reaction condition. A protecting group can also be selected such that it participates in the direct oxidation of the aromatic ring component of the compounds of the invention. For examples of useful protecting groups, see, for example, Greene et al., PROTECTIVE GROUPS IN ORGANIC SYNTHESIS, 3rd ed., John Wiley & Sons, New York, 1999.

In various embodiments, the reactive functional group is, or is a component of, a leaving group. As used herein, the term "leaving group" refers to a portion of a substrate that is cleaved from the substrate in a reaction. The leaving group is an atom (or a group of atoms) that is displaced as stable species taking with it the bonding electrons. Typically the leaving group is an anion (e.g., $Cl^-$) or a neutral molecule (e.g., $H_2O$). Exemplary leaving groups include a halogen, $OC(O)R^1$, $OP(O)R^1R^2$, $OS(O)R^1$, and $OSO_2R^1$. $R^1$ and $R^2$ are members independently selected from substituted or unsubstituted alkyl, substituted or unsubstituted aryl, substituted or unsubstituted heteroaryl and substituted or unsubstituted heterocycloalkyl. Useful leaving groups include, but are not limited to, other halides, sulfonic esters, oxonium ions, alkyl perchlorates, sulfonates, e.g., arylsulfonates, ammonioalkanesulfonate esters, and alkylfluorosulfonates, phosphates, carboxylic acid esters, carbonates, ethers, and fluorinated compounds (e.g., triflates, nonaflates, tresylates), $SR^1$, $(R^1)_3P^+$, $(R^1)_2S^+$, $P(O)N(R^1)_2(R^1)_2$, $P(O)R^3R^1R^4R^1$ in which each $R^1$ is independently selected from the members provided in this paragraph and $R^3$ and $R^4$ are each either S or O. The choice of these and other leaving groups appropriate for a particular set of reaction conditions is within the abilities of those of skill in the art (see, for example, March J, ADVANCED ORGANIC CHEMISTRY, 2nd Edition, John Wiley and Sons, 1992; Sandler S R, Karo W, ORGANIC FUNCTIONAL GROUP PREPARATIONS, 2nd Edition, Academic Press, Inc., 1983; and Wade L G, COMPENDIUM OF ORGANIC SYNTHETIC METHODS, John Wiley and Sons, 1980).

As set forth herein, the term "reactive functional group" also includes components of the condensation polymer component(s) of the stationary phase of the invention. Thus, for example, after a first condensation polymerization cycle, there will generally be at least one reactive functional group in the resulting polymer that provides a locus for attachment of higher order condensation polymer layers, i.e., a second, third, fourth, fifth, sixth or higher layer. In an exemplary embodiment in which amine-epoxide chemistry is used to form a condensation polymer, the reactive functional group in the condensation polymer can be a reactive nitrogen of an amine moiety or it can be an epoxide.

In various embodiments, the first polymer layer bears hydrophilic functional groups, for example, functional groups that were present on the polymerizable monomer precursor of the polymer. As used herein, the term hydrophilic functional groups include reactive and charged functional groups and such groups that are both reactive and charged. Exemplary hydrophilic functional groups include, without limitation, carboxylate, sulfonate, phosphate, iminodiacetate, amine, halide, hydroxyl, and epoxide. As those of skill in the art appreciate, the first polymer layer can include hydrophilic functional groups of more than one structure. For example, a first polymer layer, which is a co-polymer, can have more than one type of hydrophilic functional group.

In various exemplary embodiments, the first polymer layer is formed from a polymerizable monomer that includes at least one vinyl group. Exemplary polymers formed from such vinyl containing monomers include a polymer of acrylic acid, for example, poly(acrylic acid). In various exemplary embodiments, the first polymer layer comprises a polymer formed from a vinylbenzyl species, e.g., vinylbenzyl chloride.

In an exemplary embodiment, the first polymer layer is attached to the substrate surface. As used herein, the terms "attached" and "immobilized" are used interchangeably and encompasses interactions including, but not limited to, covalent bonding, ionic bonding, chemisorption, physisorption, electrostatic attraction and combinations thereof.

In certain embodiments, a percentage of the components of the first polymer layer are cross-linked. Any cross-linking agent, useful to crosslink two or more components of the first polymer layer can be used in the present invention.

In various embodiments, the crosslinking agent is a polymerizable monomer. Preferred addition polymerizable crosslinking precursors include: ethylene glycol dimethacrylate (EGDMA); ethylene glycol diacrylate (EGDA); propylene glycol dimethacrylate; propylene glycol diacrylate; butylene glycol dimethacrylate; butylene glycol diacrylate; hexamethylene glycol dimethacrylate; hexamethylene glycol diacrylate; pentamethylene glycol diacrylate; pentamethylene glycol dimethacrylate; decamethylene glycol diacrylate; decamethylene glycol dimethacrylate; vinyl acrylate; divinyl benzene; glycerol triacrylate; trimethylolpropane triacrylate; pentaerythritol triacrylate; polyoxyethylated trimethylolpropane triacrylate and trimethacrylate and similar compounds as disclosed in U.S. Pat. Nos. 3,380,831; 2,2-di(p-hydroxyphenyl)-propane diacrylate; pentaerythritol tetraacrylate; 2,2-di-(p-hydroxyphenyl)-propane dimethacrylate; triethylene glycol diacrylate; polyoxyethyl-2,2-di-(p-hydroxyphenyl)-propane dimethacrylate; di-(3-methacryloxy-2-hydroxypropyl)ether of bisphenol-A; di-(2-methacryloxyethyl)ypropyl)ether of bisphenol-A; di-(3-acryloxy-2-hydroxypropyl)ether of bisphenol-A; di-(2-acryloxyethyl)ether of bisphenol-A; di-(3-methacryloxy-2-hydroxypropyl)ether of tetrachloro-bisphenol-A; di-(2-methacryloxyethyl)ether of tetrachloro-bisphenol-A; di-(3-methacryloxy-2-hydroxypropyl)ether of tetrabromo-bisphenol-A; di-(2-methacryloxyethyl)ether of tetrabromo-bisphenol-A; di-(3-methacryloxy-2-hydroxypropyl)ether of 1,4-butanediol; di-(3-methacryloxy-2-hydroxypropyl)ether of diphenolic acid; triethylene glycol dimethacrylate; polyoxypropyl-1-trimethylol propane triacrylate (462); 1,2,4-butanetriol trimethacrylate; 2,2,4-trimethyl-1,3-pentanediol dimethacrylate; pentaerythritol trimethacrylate; 1-phenyl ethylene-1,2-dimethacrylate; pentaerythritol tetramethacrylate; trimethylol propane trimethacrylate; 1,5-pentanediol dimethacrylate; diallyl fumarate; 1,4-benzenediol dimethacrylate; 1,4-diisopropenyl benzene; and 1,3,5-triisopropenyl benzene. A class of addition polymerizable crosslinking precursors are an alkylene or a polyalkylene glycol diacrylate or dimethacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages, particularly when present as terminal linkages. Members of this class are those wherein at least one and preferably most of such linkages are conjugated with a double bonded carbon, including carbon double bonded to carbon and to such heteroatoms as nitrogen, oxygen and sulfur. Also included are such materials wherein the ethylenically unsaturated groups, especially the vinylidene groups, are conjugated with ester or amide structures and the like.

Following the attachment or formation and attachment of the first polymer layer to the substrate, a first condensation polymer reaction product layer ("CPRP") is formed on and attached to the first polymer layer. The CPRPs are referred to herein as "layers" although each CPRP typically includes spaces or openings. As used herein, the terms CPRP, "condensation polymer" and "condensation polymer reaction product" are used interchangeably and refer to a product formed by the reaction of an electrophilic reactive species and a nucleophilic reactive species. One of these species is generally a polyfunctional compound. The CPRP is a repeating organic chain, formed through the linkage of many identical smaller molecules in which chain growth occurs in a stepwise manner between monomers, at least one of which is generally a multifunctional monomer. In exemplary embodiments, the first condensation polymer layer is attached to the first polymer layer as an "intact polymer," by which is meant the condensation polymer is pre-formed prior to its attachment to the first polymer layer. The discussion herein regarding the formation of condensation polymers is germane to this embodiment both with respect to the method of making the intact polymer and exemplary intact polymers of use in the present invention. Higher order condensation polymer layers can be built out above the intact polymer layer, using this layer as a foundation or "basement layer" as discussed herein.

The condensation polymer is formed by the reaction of at least two compounds, which can be contacted with the polymer coated substrate in essentially any useful order, amount or ratio of amounts. The concept of the formation of the condensation polymers is illustrated herein by reference to the reaction of an amine with a polyfunctional compound. The invention is not limited to condensation polymers formed in this manner and these polymers can be formed using essentially any nucleophilic and electrophilic component. The present invention is further illustrated by reference to a polyfunctional electrophile, however, within the scope of the invention is the use of a polyfunctional nucleophile or electrophile.

As will be appreciated by those of skill in the art, the process for forming the CPRP set forth above can be repeated any desired number of times to build out successive layers of CPRP. In various embodiments, the process is repeated 2, 3, 4, 5, 6, 7, 8, 9 or 10 or more times. Moreover, the order of CPRP component monomer addition, the identity of the component (s) and the ratio of the components can be different from one CPRP layer to the next. Thus, the present invention provides a highly versatile method of forming ion exchange media with a broad range of architecture and function.

In various embodiments according to the process set forth above, the reaction is performed to provide an excess of reactive first nitrogen atom from an amine compound or first polyfunctional compound in the first CPRP. By "unreacted" is meant that one or more of the amine moieties of the amine compound is unreacted or not fully reacted (e.g., a primary amine reacted to a secondary amine is available for further reaction to a tertiary or quaternary amine, and is a "reactive nitrogen" as defined herein) or reactive functional groups of the polyfunctional compounds is unreacted (and therefore reactive). This can be accomplished adjusting by the molar ratio of reactants, the concentration of the reactants, the temperature of the reaction or the reaction time.

If a molar excess of the polyfunctional compound or reactive nitrogen compound is used to provide the unreacted compound excess in the CPRP, the molar excess may vary over a wide range depending upon the characteristics to be imparted to the end product. Thus, for example, the excess expressed in terms of molar ratio of the reactants can be from as low as 0.2:1 to as high as 5:1 or more. More preferably the ratio is between 0.75:1 and 1:1.25. Some of the factors used to choose the excess amount is explained in more detail hereinafter.

The first CPRP is referred to herein as a "basement layer," and it is attached to the first polymer layer. The basement layer it is not necessarily a layer which totally covers or coats the first polymer layer to which it is attached. Each successive condensation polymer reaction product provides additional coverage for the substrate. Preferably, when the last of the series of CPRP is formed, the combination of the CPRPs forms a coating essentially covering the first polymer layer. The "basement layer" can be built out by in situ condensation polymerization or it can be attached to the first polymer layer as an intact, e.g., pre-formed, polymer. When an intact polymer is used, it will generally have a reactive functional group with reactivity complementary to the reactive functional group on the first polymer layer, allowing the attachment of these two layers.

In an exemplary embodiment, the "basement layer" of step (b) is prepared using a mixture of polyfunctional amine and polyfunctional epoxide compounds. The composition of this layer is adjusted so that the mixture will not produce a gel under the conditions of application of the "basement layer." For example, methylamine (a trifunctional amine capable of reacting with a total of three epoxy groups, forming a quaternary ion exchange site) is preferably combined with a water-soluble diepoxide (a difunctional epoxide), in a preferred embodiment 1,4-butanediol diglycidyl ether. If these two ingredients are combined in the ratio of two moles of methylamine to three moles of 1,4-butanediol diglycidyl ether, they tend to form a cross-linked gel since they are combined together in a stoichiometry complementing of their functionality.

In an exemplary embodiment, useful "basement layer" coatings are achieved by using a 1:1 mole ratio of the preferred reagents while allowing the reagents to react in the presence of a polymer coated substrate for one hour at 65° C. Using this composition allows formation of a largely linear CPRP on the surface of the substrate. The condensation polymer formed with this composition contains a significant number of reactive nitrogen sites, because under these conditions the amine reactant is in excess in terms of the functionality of the polyfunctional reagent. Thus, when combining methylamine (a trifunctional reagent) and 1,4-butanediol diglycidyl ether (a difunctional reagent) in a 1:1 ratio, a polymer will be formed with on average two 1,4-butanediol diglycidyl ether reagents attached to each methylamine reagent forming a largely linear polymer with the resulting polymer being primarily an alternating polymer with amine and 1,4-butanediol diglycidyl ether groups alternating in the polymer chain. The majority of all amine groups thus formed being tertiary at the completion of the "basement layer" preparation step although some of the amine groups at this point will be quaternary and some of the amine groups will be secondary. These tertiary amine groups (as well as the secondary amine groups) are still available for further reaction, forming quaternary sites at each reaction site. Accordingly, the "basement layer" is accessible for subsequent treatment with polyfunctional epoxides.

In one exemplary embodiment, the substrate, already coated with the first polymer layer and the "basement layer," is subsequently allowed to react with a large excess (e.g., 50 to 200%) of polyfunctional epoxide, preferably butanediol diglycidyl ether in order to attach the reagent to the "basement layer". By utilizing a large excess of polyfunctional epoxide, the "basement layer" is decorated with pendant unreacted epoxide groups. Following treatment with a large excess (e.g., 50 to 200%) of polyfunctional epoxide, the substrate is treated with a large excess of polyfunctional amine, preferably methylamine. This leaves the surface decorated with pendant groups containing an amine functionality with two residual reactive sites (i.e., a reactive nitrogen atom).

Repeating the cycle of using a large excess of polyfunctional epoxide followed by a large excess of polyfunctional amine results in branch points at every amine with a quaternary site at the branch points. Theoretically, making use of 1,4-butanediol diglycidyl ether and methylamine and alternating reactions, results in a doubling of the number branches with each layer. By utilizing this method, very high capacities are achieved by repeating the cycle a suitable number of times (e.g., at least 3, 4, 5, 6, 7, 8 or more times). In practice, the situation is significantly more complex than this because as branching increases the probability of branches becoming cross-linked together also increases. Accordingly, materials produced using the preferred embodiment will tend to have an increasing amount of cross-link as the number of cycles increases (assuming at least one of the reagents utilized has a functionality >2). However, if layers are alternated with both a difunctional amine and a difunctional epoxy, chain propagation will be predominantly linear and cross-linking side reactions will be greatly diminished.

In an exemplary embodiment, epoxy monomer is used to produce hydroxide selective materials. Hydroxide selectivity requires hydroxyl functional groups located near the quaternary center of each anion exchange site. Epoxy monomers provide such hydroxyl groups as a byproduct of the reaction of epoxides with amines. Accordingly, such condensation polymers are particularly useful for making hydroxide selectivity anion exchange phases. However, this does not limit the utility of the invention to epoxy monomers and amines. In fact, analogous condensation polymers can also be produced using for example polyfunctional alkylhalides in conjunction with polyfunctional amines. Such condensation polymers will not be hydroxide selective but will still be useful for preparation of anion exchange phases.

In an exemplary embodiment, the excess of the reactive nitrogen atom of the first amine compound or first polyfunctional compound enters into the reaction of step (c). There, at least a second amine compound or second polyfunctional compound is reacted with the reactive nitrogen of the first amine compound or first polyfunctional compound in the first CPRP to form a second CPRP. For example, if the reactive nitrogen group derived from the first amine compound is in excess in the first CPRP, then in step (c) a second polyfunctional reaction product is reacted with the excess reactive nitrogen of the first amine compound in step (b) to form a second CPRP. Conversely, if the first polyfunctional compound is in excess in the first CPRP, then in step (c), a reactive nitrogen of a second amine compound is reacted with the excess first polyfunctional compound (or a reactive functional group derived from the polyfunctional compound) to form the second CPRP. Those of skill in the art will appreciate that reference to the use of an amine in this step is exemplary and other reactive functional groups, particularly nucleophilic reactive functional groups (e.g., OH, SH) can be used rather than the amine.

In various embodiments, referring to the reactants in step (b), the first amine compound comprises an amine group selected from the group consisting of ammonia, a primary amine and a secondary amine. The first amine compound can include additional amine groups and may include primary, secondary and/or tertiary amines.

The compounds used in step (b) may include the first amine compound as the only amine compound and the first polyfunctional compound as the only polyfunctional compound. Alternatively, it can include mixtures of the first amine compound with one or more additional amine compounds and/or mixtures of the first polyfunctional compound with one or more additional polyfunctional compound. Further, it can include the first polyfunctional compound alone with the first or additional amine compounds or may include a mixture of the first polyfunctional compound and one or more additional polyfunctional compounds. In this way, each condensation polymer reaction product may be tailored to include the desired functions.

Further, the reactive nitrogen atoms in each amine compound and the two functional moieties in the polyfunctional compounds may be the same or different from each other. For example, the first amine compound may include at least only a primary amine group, only a secondary amine group, one or more primary and/or secondary groups, or the like. Similarly, the first polyfunctional compound may include the at least two functional moieties reactive with the amine groups which are of the same type or a different type, and may include, in addition, more than two functional moieties.

As set forth above a wide variety of alternative polyfunctional amines are also suitable for the present invention including simple diamines, triamines and higher polyamines. Propagation of polymer growth steps requires that the amine contain at least two available reactions sites. Termination of polymer growth can be accomplished by a final reaction step with tertiary amine containing compounds or the reaction can be ended without such a terminating reaction.

Suitable amine groups of use in step (b), later steps, or in repeated steps include, methylamine, ethylamine, propylamine, isopropylamine, butylamine, isobutylamine, sec-butylamine, tert-butylamine, amylamine, tert-amylamine, hexylamine, heptylamine, octylamine, benzylamine, phenethylamine, ethanolamine, 3-amino-1-propanol, 1-amino-2-propanol, 2-amino-1-propanol, 2-amino-1,3-propandiol, 4-amino-1-butanol as well as numerous other primary amines either with or without additional polar and/or hydrophilic substituents. Also of use are secondary amines, e.g., dimethylamine, diethylamine, dipropylamine, diisopropylamine, dibutylamine, diisobutylamine, di-sec-butylamine, di-tert-butylamine, di-tert-amylamine, dipentylamine, dihexylamine, diethanolamine, methylethanolamine, ethylethanolamine, morpholine as well as numerous other secondary amines either with or without additional polar and/or hydrophilic substituents. Similarly of use are aliphatic diamines such as ethylenediamine, 1,3-diaminopropane, 1,2-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 1,2-diaminocyclohexane, 1,4-diaminocyclohexane, aromatic benzylic diamines such as m-xylylenediamine, p-xylylenediamine, aliphatic polyamines such as diethylenetriamine, triethylenetetramine and higher polymeric analogues as well as a variety of other structures containing multiple primary, secondary and/or tertiary amine groups in a single compound.

Ammonia and both primary and secondary amines are polyfunctional in nature in that they each include a reactive center that can undergo more than one reaction, for example, with a polyfunctional group to form a CPRP as will be described hereinafter. The size of the amine compounds may vary over a wide range from simple non-polymeric compounds, e.g., with molecular weights ranging from 17 to small polymeric compounds with molecular weights of 200 to 10,000. Moreover, amines of use in the invention can be polyfunctional, i.e., including more than one amine moiety. In various embodiments using a polyfunctional amine, a polyfunctional amine compound has at least three atoms in the link between each amine group in order to achieve good reactivity for each amine group. Polymeric species such as polyethyleneimine and polyamines derived from the hydrolysis of n-vinylformamide polymers are also useful in the present invention.

Exemplary polyfunctional compounds include at least two functional moieties reactive with the reactive nitrogen atom of the amine groups in the first or subsequent amine compound forming the first, second or higher numbered CPRP layers. Suitable functional moieties in the polyfunctional compounds include one or more of epoxides, alkyl halides, benzylhalides, tosylates, methylsulfides and mixtures thereof.

Exemplary epoxides include butadiene diepoxide, ethyleneglycol diglycidyl ether, butanediol diglycidyl ether (e.g., 1,4-butanediol diglycidyl ether), diethyleneglycol diglycidyl ether, hexanediol diglycidyl ether, glycerol triglycidyl ether and numerous other compounds containing two or more epoxy groups including epoxy resins commonly used in commercial epoxy formulations. Suitable alkyl halides include dichloroethane, dichloropropane, dichlorobutane, dibromoethane, dibromopropane dibromobutane as well as numerous other alkyl halides. Suitable benzylhalides include alpha, alpha-dichloroxylene and alpha, alpha-dibromoxylene as well as numerous other benzylic halides. Suitable tosylates include ethyleneglycolditosylate, diethyleneglycolditosylate as well as tosylates of various other aliphatic or aromatic polyols. Suitable methylsulfides include 1,3-bis(methylthio) propane and 1,4-bis(methylthio)butane as well as numerous other polymethylsulfides. The polyfunctional compounds for the present invention preferably include epoxide polyfunctional moieties defined to include monoepoxide compounds, diepoxide compounds and/or polyepoxide moieties in compounds including polymers. The linker arms set forth in this non-limiting description are of general applicability with respect to polyfunctional compounds other than epoxides, e.g., those including one or more reactive functional group set (e.g., alkyl halides, benzylhalides, tosylates, methylsulfides).

In general terms, epoxides and amines react as set forth in U.S. Pat. No. 7,291,396, which is incorporated herein by reference in its entirety. Reactions between epoxides and ammonia, primary amines and secondary amines produce a reaction product which is directly suitable for subsequent reactions since the reaction product is in the freebase form. Depending on the reaction conditions, other polyfunctional compounds such as alkyl halides produce reaction products which are in the salt form, necessitating a separate step or additional reagents to convert the reaction product back to the freebase form.

In the case of tertiary amines, the reaction product is a quaternary ammonium ion, and the quaternized nitrogen of the product is not considered to be a reactive nitrogen atom. Unlike the previous example, this reaction also requires one mole of water. The counterion formed spontaneously as a byproduct of this reaction is hydroxide anion. This byproduct is advantageous in that it helps maintain an alkaline reaction medium which is beneficial for subsequent reaction of adjacent amine groups with additional polyfunctional compounds.

In an exemplary embodiment, in which the diepoxide is used in large excess relative to the amine concentration, the simplest conceivable reaction product is a trifunctional quaternary ammonium compound. As in the previous example, the quaternary ion exchange site has a hydroxide counterion as a reaction byproduct. In practice, the actual product formed under these conditions is far more complex. In most cases, the product contains a mixture of quaternary sites and tertiary sites and the hydroxide present in the reaction product will also tend to catalyze polymerization of the diepoxide which will result in a complex reaction product.

In various embodiments, the condensation polymer is formed by reaction of a diepoxide and a primary amine in a 1:1 ratio (diepoxide:amine). Although a number of side groups and branch points are possible reaction byproducts, the predominant product of such a reaction is a linear polymer where each segment contains a tertiary amine group along with a hydrophilic linker. The degree of polymerization is dependent upon reaction conditions but the number of such repeating units (n) in the polymer thus formed can vary from as low as two or three to as high as several hundred. Ideally, high degrees of polymerization will be achieved in order at to provide good coverage of the entire surface and strong adhesion to the surface.

In an exemplary embodiment, the first CPRP has an excess of reactive nitrogen atoms from the amine and the substrate is a collection of resin particles of suitable size for chromatographic packing. In various embodiments, a second CPRP attached to the first CPRP is formed. In this instance, the reactant in excess in the first CPRP is the reactive nitrogen of the amine compound and so the second condensation reaction product is formed with the polyfunctional compound in the form of a diepoxide compound. The second CPRP contains pendant reactive epoxide groups decorating the surface. In addition, this step serves to further cross-link the "basement layer" through cross-links between adjacent polymer strands (not illustrated), thus rendering the second CPRP a cross-linked conformal coating, no longer requiring electrostatic adhesion to retain the coating. Because the quaternary sites contain hydroxide counteranions, the epoxide groups pendant to the surface are prone to base hydrolysis which will produce a surface decorated with glycol functional groups. While such a reaction product might be useful for some applications, it would interfere with further reactions. Thus, in an exemplary embodiment, an additional treatment with an amine compound is done immediately following formation of the second CPRP in cases where further layers are desirable. In an exemplary embodiment, a third CPRP is formed in which the excess epoxide in the second CPRP is reacted with a primary amine. The third CPRP contains a surface decorated with secondary amine groups. It is possible that some of the amine groups have reacted with adjacent epoxy groups to form surface cross-links but generally the density of such surface groups is too low to allow for this. As mentioned above, preparation of this third CPRP is preferably accomplished immediately following the completion of the preparation of the second CPRP in order to avoid hydrolysis of pendant epoxide groups. Since each of the secondary amine groups is still a difunctional compound, further reaction with a diepoxide will result in a branch point at each of the pendant amine groups provided the reaction is driven to completion.

The size of the polyfunctional compounds may vary over a wide range from simple non-polymeric compounds, e.g., with molecular weights less than 87 to small polymeric compounds with molecular weights of 234 to 10,000. Exemplary polyfunctional compounds are water soluble and consist of glycidyl ethers of polyols or contain glycidyl ethers attached to hydrophilic polymers such as polyethyleneglycol or polypropyleneglycol or are combinations of all three such as glycerol propoxylate triglycidyl ether. More preferably the molecular weight range for the polyfunctional compound is between 200 and 500.

Other polyfunctional reagents capable of forming condensation polymers with either polyfunctional amines or polyfunctional epoxides may also be used in conjunction with or in the place of materials suitable for reacting with amines or materials suitable for reacting with epoxides. Suitable alternative polyfunctional reagents for reacting with polyfunctional amines include 2-methyl-2-nitro-1,3-propanediol, dithiobis(succinimidyl propionate), cyanuric chloride, and polyfunctional acid chlorides such as dimethyl adipimidate dihydrochloride. Suitable alternative polyfunctional reagents for reacting with polyfunctional epoxides include compounds such as polyfunctional thiols. Preferably suitable reagents are also water-soluble in order to facilitate water-based synthesis methods.

Referring to step (c), the at least a second amine compound or second polyfunctional compound are analogous to the first amine compound and first polyfunctional compound and the discussion regarding the first compounds is directly relevant to the second compounds. Thus, the second amine compound may be in a mixture with one or more additional amine compounds and may comprise one or more primary and/or secondary amine groups in the second amine compound. For example, assuming the reaction of step (c) uses a second polyfunctional compound, it too can be used in a mixture with other polyfunctional compounds and may include two or more functional moieties reactive with the amine groups. The terms "second amine compound" and "second polyfunctional compound" in step (c) are used to show that step (c) occurs after step (c). However, the meaning of the term "second amine compound" encompasses an amine compound which is the same as or different from the first amine compound. Similarly, the term "second polyfunctional compound" encompasses a second polyfunctional compound which is the same as or different from the first polyfunctional compound.

In various embodiments, successive CPRPs are formed after step (c) by repeating that or an earlier step, alternating the excess of amine compound or polyfunctional compound so that in each successive layer the opposite of these two compounds is reacted with the reactive moiety in the prior layer to form an additional CPRP. For example, after step (c), a step (d) may be performed in which at least a third amine compound or third polyfunctional compound is reacted with the reactive moiety of the other compound in the second CPRP. Thus, the third amine compound or third polyfunctional compound is reacted with the reactive nitrogen of the second amine compound or the reactive functional group derived from the second polyfunctional compound in the second CPRP to form a third CPRP. As discussed above, this process can be repeated as many times as desired to accomplish desired properties to the end product, typically in the form of a complete coating on the substrate.

In another exemplary embodiment, a hyperbranched product is formed with four CPRPs. Branching can occur at the reactive nitrogen of the amine compound. As mentioned above, such branching is a byproduct of the residual difunctionality of the reactive nitrogen of the secondary amine groups decorating the surface. The branching occurs in the fourth CPRP.

In further embodiments, a product with a fifth CPRP is formed in which the branched condensation reaction product is cross-linked using reactive nitrogen atoms of amine compounds. As the level of branching increases, the probability of cross-links between adjacent branches also increases. The number of such groups is expected to increase by increasing the number of reaction steps but other parameters such as reagent concentration, reaction time and reaction temperature can also play a role in determining the magnitude of cross-links. For example, using a relatively low concentration of multifunctional reactive nitrogen from an amine compound during the formation of the fifth CPRP increases the probability that a pendant amine group will have the opportunity to react with adjacent reactive groups of the polyfunctional component (e.g., the epoxy groups). Thus, the level of cross-link can be tailored to meet the specific separation selectivity requirements by adjusting the concentration of the amine, the temperature of the reaction and the duration of the reaction. Use of reaction conditions insufficient to drive the reaction to completion is also used as a means of inducing cross-link. For example, if conditions are chosen such that only half of the pendant reactive groups of the polyfunctional component (e.g., epoxide groups) have reacted with a multifunctional amine compound, after excess multifunctional amine compound has been removed from contact with the CPRP, additional cross-linking reactions can still take place between adjacent pendant amine and polyfunctional component (e.g., epoxide) branches.

Using the above method, in various embodiments, a coated ion exchange substrate is formed in which the coating comprises at least a first and second CPRP. The first CPRP is attached to the first polymer layer and is formed from at least a first amine compound of the foregoing type and at least a first polyfunctional compound with at least two functional moieties reactive with the reactive nitrogen groups of the first amine compound. A second CPRP is formed from the reaction product of the first amine compound and/or first polyfunctional compound with a second amine compound and/or second polyfunctional compound. This product encompasses at least the first and second CPRPs, in addition, a third or any subsequent CPRPs formed in sequential reaction with the second CPRP as described above.

At any time in the processes set forth herein using amine and epoxide chemistry, the outside layer of the condensation polymer reaction product has the cationic functionality of the amine groups. The cationic amine product may be used directly in this form without further modification. In this case, the product of this reaction will contain both strong anion exchange sites and weak anion exchange sites which can be advantageous for some separations. In another preferred embodiment, strong anion exchange sites may be introduced into the outside layer of the condensation polymer through a capping reaction by reacting with a capping compound comprising a tertiary (or quaternary) amine group. In this manner, the reaction is capped or terminated and the ion exchange coating includes a greatly increased number of quaternary amines conventionally used for the separation of anions.

In another embodiment, the coated ion exchange substrate may be converted to a cation exchange substrate by reacting excess amine functional groups on the exterior surface of the coated substrate with anionic compounds to convert the CPRP to a cation exchange material. Suitable anion-containing groups include derivatives of sulfonic acid, phosphonic acid and carboxylic acid or combinations thereof. Preferably, suitable anion-containing functional compounds include two or more anionic functional groups such that the total number of anionic functional groups exceeds the number of previously formed anion exchange sites. Suitable compounds include: γ-carboxyglutamic acid, nitrilotriacetic acid, 3,3',3"-nitrilotripropionic acid, N-(2-carboxyethyl)iminodiacetic acid, N-(phosphonomethyl)glycine, 2-amino-3-phosphonopropionic acid, iminodi(methylphosphonic acid), 2-aminoethylphosphonic acid, piperazine-1,4-bis(2-ethanesulfonic acid), homocysteic acid and 2-amino-3-sulfopropionic acid, chloroacetic acid, bromoacetic acid, chloropropionic acid, bromopropionic acid, sodium 2-chloroethanesulfonate, sodium 2-bromoethanesulfonate or 1,4-Butane sultone. Phosphonic acid cation functional groups can be introduced using suitable reagents such as phosphorous pentachloride or phosphorous oxybromide followed by hydrolysis and derivatives thereof, as well as numerous other anion-containing cation compounds.

Similarly, a polyfunctional reactive group can be converted to a cation exchange group by reacting it with amine containing cationic compounds listed above. In this case the amine reacts as previously described with the polyfunctional groups leaving one or more anionic charges available on the surface.

In one embodiment, one or more of the condensation polymer functional groups is branched and/or cross-linked. For example, the second, third or higher CPRPs can be branched and cross-linked by appropriate choice of reagents and by choice of reagents and by adjustment of the ratios of reagents and excesses of one or the other of the amine compounds and polyfunctional compounds as set forth hereinafter.

Formation of a gel in a resin slurry mode or a flow-through "packed column" mode may be undesirable in that in the former case gelation would result in resin particles suspended in a stable gel unsuitable for use in liquid chromatography and in the latter case would result in the development of extremely high pressures, precluding the use of pumping as a means of delivering the reagent, rendering the material unsuitable for use in liquid chromatography. If instead, the ratio of the reagents is adjusted so that a gel does not form (preferably using a composition close to that capable of gelation without using a composition capable of gelation), the solution can be passed through the "packed column" without experiencing a high-pressure characteristic of gelation. Furthermore, the coating thickness will continue to increase as this solution is passed through the column.

Conditions leading to gel formation are generally to be avoided, especially in the case of slurry grafting, useful synthesis methods include use of combinations which ultimately lead to gel formation by simply reducing exposure time of the resin to the reaction mixture such that the exposure time is less than the gelation time of the reaction mixture. In one useful embodiment of the current invention, passing such a solution through a packed bed of resin not only results in a graft to the resin surface but also in attachment of the individual particles in the packed column to form a particle based monolith. By choosing appropriate conditions, the resulting monolith can be removed from the column body within which it was formed. Because polymers generally contract as polymerization proceeds, the column contents shrink away from the column wall allowing removal of the monolith from the column hardware. The resulting monolith is generally flexible when well hydrated. By allowing the monolith to dry and reinserting it into suitable dimension column hardware, the resulting monolith can be utilized for chromatographic separations.

While the exact conditions may vary in terms of concentration, temperature and time required for a given mixture of polyfunctional epoxy monomer and polyfunctional amine to result in gel formation, there is a simple empirical experimental methodology suitable for determination of conditions optimal for preparation of the CPRP in order to promote or prevent gel formation during this step. First, start with a 1:1 mole stoichiometry and produce a solution of the two reagents in the proposed reaction solvent. The reagents react for the proposed reaction duration at the proposed temperature and the presence or absence of gel formation is noted. If gel formation is observed, the quantity of epoxy monomer is decreased and the process repeated until the boundary between gel forming conditions and non-gel forming conditions is established. Alternatively, if no gel formation is observed, the amount of epoxy monomer is increased in the formulation until gel formation is observed.

Also, according to the invention, a large quantity of particles may be packed in a bed and coated in a large flow-through column and removed in large quantities as a supply for packed smaller analytical columns.

In various embodiments, one or more of steps (a), (b), (c), (d) and/or (e) are performed in a flowthrough chamber. In these embodiments one or more of the reactive components is flowed through the chamber. Thus, a member selected from a member selected from the polymerizable monomer, the first intact polymer, the first, second and higher order amine compounds and first, second or higher order polyfunctional compounds are flowed past the substrate. When more than one reactive component is flowed through the chamber, they are flowed either together or sequentially.

An advantage of various embodiments of the current invention is that when the condensation polymer is applied to a column packed with substrate, the coating process can be interrupted for column evaluation, and then the process can be resumed. However, because epoxides are subject to hydrolysis under alkaline conditions, it is generally preferable to interrupt the reaction after reaction with a polyfunctional amine containing reagent rather than immediately after reaction with a polyfunctional epoxy containing reagent. Likewise, although the preferred polyfunctional epoxide is butanediol diglycidyl ether a wide variety of polyfunctional epoxides may be used in the present invention. Ideally the polyfunctional epoxide should be water-soluble to facilitate formation of the condensation polymer under aqueous conditions but any of the numerous polyfunctional epoxides available can be used for this purpose. Furthermore, a wide variety polyglycidyl reagents not readily available can be readily synthesized using standard synthesis methods.

While in situ column preparation of condensation polymers is a convenient way of quickly evaluating different formulations, in-situ column preparation is generally not as efficient as batch synthesis. However, by making use of either slurry grafting techniques or preferably large packed bed reactors, optimal coating chemistries can easily be transferred to larger scale batch processes.

Suitable substrates include a variety of commercially available chromatographic media such as packed beds of chromatography particles, and also include many other formats including tubing which has been suitably derivatized and fused silica capillaries which can be used after a simple base hydrolysis treatment to activate the surface. Thus, the term "substrate" encompasses one or more substrates unless otherwise specified. Furthermore, products based on planar materials such as "chips" and arrays commonly employed in biological assays may also be employed as substrates. In the latter case, the surfaces may be modified by application of multiple layers as described above or one or more layers of gel forming reagent mixtures may be applied to the surface to form binding sites for biological molecules.

In various embodiments, the substrate is in the form of particles. Also of use are various forms of flow-through monolithic media and flow-through hollow tubes in which one or more walls serve as the substrate.

In one embodiment, the substrate has a surface comprising an organic polymer. This organic polymer surface is distinct from the "first polymer layer" discussed herein. The term "surface" encompasses both the surface of a substrate which is of the same chemical makeup as the remainder of the substrate, and a surface with a surface layer on a support substrate of a different chemical makeup. Thus, the organic polymer surface may comprise the entire substrate or just the top surface of the substrate which may be formed of another material such as one made of an inorganic oxide. Alternatively, the substrate may comprise in inorganic material on its surface, such as one made of an inorganic glass or oxide, e.g., silica gel, alumina, titania, zirconia, and fused silica.

In various embodiments, the substrate is a styrenic substrate. In these embodiments, the first polymer layer can be attached to the substrate through reaction of styryl residues on the substrate surface with an incoming monomeric precursor of the first polymer layer. In an exemplary embodiment, the first polymer layer attached to the substrate is based on a vinyl monomer. In various embodiments, the vinyl monomer is an acryloyl monomer, such as acrylic acid. Thus, in exemplary embodiments, the invention provides an ion exchange medium having a styrenic substrate to which a first polymer layer comprising acrylic acid is attached.

In various embodiments, the acrylic acid first polymer layer serves as a foundation for the assembly of one, two, three, four, five or more successive layers of condensation polymer. In various embodiments, the condensation polymer is formed by the condensation polymerization of one or more amine with one or more epoxide. In exemplary embodiments, the epoxide is a component of a polyfunctional compound that includes at least one functional group in addition to the epoxide. An exemplary additional functional group is a second epoxide.

In various embodiments of the invention, the substrate includes a reactive functional group or anionic or cationic functional moieties on its surface.

In another exemplary embodiment the invention provides an aggregated chromatographic material incorporating the ion exchange material set forth herein. Thus, the ion exchange medium of the invention is contacted with a second ion exchange medium having an opposite charge under conditions promoting the electrostatic aggregation of the two ion exchange materials, thereby forming an electrostatically aggregated ion exchange medium. In various embodiments, the coated ion exchange material of the invention is negatively charged and the second ion exchange medium is positively charged. In another exemplary embodiment, the coated ion exchange material of the invention is positively charged and the second ion exchange medium is negatively charged. Such aggregated media are described in, for example, Small, et al. U.S. Pat. No. 4,101,460 in which is described finely divided insoluble materials are bound by electrostatic attraction to substrate particles having ion exchange sites.

In various embodiments, the aggregate is submitted to one or more rounds of condensation polymer formation conditions as set forth herein. Thus, an exemplary aggregate is submitted to a mixture of an amine containing a reactive nitrogen atom, and a polyfunctional compound. The product of this treatment can be submitted to additional rounds of condensation polymerization, another aggregation step or a combination thereof. Exemplary condensation polymerization chemistry of use in this embodiment includes the reaction of an amine with a polyfunctional (e.g., diepoxide).

Thus, in various embodiments, the invention provides a method of contacting the electrostatically aggregated ion exchange medium with (i) at least a first amine compound comprising a first reactive nitrogen group which is a member selected from the group consisting of ammonia, a primary and a secondary amine, (ii) at least a first polyfunctional compound, having at least two first reactive functional groups reactive with the first reactive nitrogen group, and (iii) a combination thereof, thereby forming a first condensation polymer reaction product attached to said electrostatically aggregated ion exchange medium. The components of use in these embodiments are generally as described above.

In an exemplary embodiment, the invention provides a stationary phase having a poly(acrylic acid) first polymer layer. Successive condensation polymers are built up on the first polymer layer by one, two, three, four, five, or six or more rounds of treating the stationary phase with a diepoxide and an amine. At any point after the first round of treatment, the stationary phase is optionally aggregated with a particle having a charge opposite that of the stationary phase. The aggregate then can be submitted to one, two, three, four, or five or more rounds of treating the stationary phase with a diepoxide and amine. At any point during the sequence of treatment rounds, the charge of the condensation polymer on the stationary phase can be changed by, for example, reacting the amine groups on the condensation polymer with a compound bearing both a reactive functional group complimentary to the amine and a negatively charged group (e.g., carboxylate) or protected negatively charged group (e.g., ester). An exemplary amine is methyl amine and an exemplary epoxide is 1,4-butanediol diglycidyl ether.

In various exemplary embodiments, the invention provides a stationary phase having attached thereto a first polymer layer and a first condensation polymer layer formed by the reaction of an amine with a diepoxide. In an exemplary embodiment, the amine is a primary amine. In an exemplary embodiment the diepoxide is an aliphatic diepoxide, such that the expoxide groups are linked via a substituted or unsubstituted alkyl moiety having 1, 2, 3, 4, 5, 6, 7, 8, 9, 10 or more carbon atoms in the chain. An exemplary aliphatic diexpoxide is 1,4-butanediol diglycidyl ether. In another exemplary embodiment, this stationary phase has at least 1, 2, 3, 4, 5, 6 or more additional layers of condensation polymer layered above the first condensation polymer layer. In various embodiments, each successive layer of condensation polymer is attached to the layer below it. In an exemplary embodiment, at least 1, 2, 3, 4, 5, 6 or more of these condensation polymer layers are formed by the reaction of a primary amine with a diepoxide. In exemplary embodiments, at least 1, 2, 3, 4, 5, 6 or more of these layers are formed by condensation polymerization of the same primary amine, the same diepoxide or a combination thereof. In certain embodiments, a condensation polymer layer is used to form an electrostatically attached aggregate with particles of a charge opposite that of the condensation polymer layer. In still further exemplary embodiments, the aggregate is exposed to condensation polymerization conditions including a primary amine and a diepoxide as set forth herein.

As will be apparent to those of skill in the art, the various elements of the exemplary embodiments set forth above can be combined in various manners to produce stationary phases that are within the purview of the instant invention.

In order to further illustrate the present invention, the following non-limiting examples of its practice are provided.

Example 1

This example shows the synthesis of an organic layer on top of a chromatography substrate packing. Typically a polyvinyl benzene based polymer that is cross linked with divinyl benzene (55%) is used as the substrate resin. The process is as follows, 100 g of the substrate packing material was first dispersed in 50% IPA in Deionized (DI) water solution. The resin was submerged in the solution and mixed well. The resin was then rinsed twice with DI water and then filtered to a moist cake. The moist cake is dispersed in 200 g of DI water and then the monomer (A) and Initiator (B) was added. A) was comprised of a 10% to 20% monomer (Acrylic acid) in 200 gm of DI water and then 100 g of IPA solvent was added to the reaction mixture. The resin was mixed well. B) was comprised of 6 g of initiator (azobiscyanovaleric acid) which was added to a mixture of 30 g of DI water and 20 g of base (50% NaOH). The mixture was sonicated before adding this to the resin monomer mixture. The synthesis reaction proceeded with stirring at 72° C. for 5 hours. The resin was filtered and washed with hot DI water and filtered. The resin was washed three more times and filtered to obtain a resin with the desired hydrophilic organic layer.

Example 2

For comparison purposes the substrate resin from Example 1 was also sulfonated. This procedure was designed to follow U.S. Pat. No. 7,291,395. The sulfonation procedure was as follows. A 1:5 ratio of resin to acetic acid (w/w) slurry was prepared first. Sulfuric acid was added to this mixture at a ratio of 1:20 (w/w) of resin to sulfuric acid. The mixture was stirred well and sulfonation proceeded at a) room temperature for 1 hour and at b) 4 hours at 50° C. The reaction was quenched by adding the resin mixture to a DI water reservoir of 1:10 resin mixture to DI water (w/w) ratio. The resin was filtered and washed with base and then with 20% methanol with a DI water rinse added in between these steps.

Example 3

The resin from example 1 and 2 were next reacted following an amine epoxide chemistry as illustrated below. This was an in-column synthesis process and the resin was first packed into a 9×250 mm column by making a slurry in DI water and then packing this using DI water at a packing pressure of 4000 psi for 10 minutes. Next a chromatographic pump with a gradient proportioning valve was used for this work. The proportioning valve was connected to three solutions as listed below:

E1: 9.8% 1,4-Butanediol diglycidyl ether (BDDGE)
E2: 4.1% Methyl amine
E3: DI water The solutions were proportioned as outlined below and pumped into the packed column from above (9×250 mm) and using a flow rate of 3 ml/min. The column was placed in a water bath at 60° C.

| % E1 | % E2 | % E3 | Comments |
|------|------|------|----------|
| 72   | 28   | 0    | Ground layer for 60 minutes |
| 100  | 0    | 0    | Diepoxide layer for 35 minutes. |
| 0    | 100  | 0    | Methyl amine layer for 35 minutes |
| —    | —    | —    | Repeat the diepoxide and amine layer two more times. |
| 0    | 0    | 100  | DI water rinse for 30 minutes. |

The resin synthesis was complete. The column was hooked directly for analysis or more preferably the column could be unpacked and then the phase repacked into smaller dimensions suitable for chromatography.

Example 4

An in vial synthesis protocol was also developed as illustrated below. In this case in place of the column from Example 3 a vial or a straight walled flask of suitable dimensions were used for the synthesis protocol. 10 g of substrate resin from Example 1 or 2 as the case may be was added to the vial and then 10 g of DI water was added with 1 g of BDDGE monomer and 0.38 g methyl amine, with DI water wash solutions from the two reactants that amounted to 3 g was added. The vial was placed in an oven set at 80° C. and the vial was tumbled and the reaction was allowed to proceed for 45 minutes. Once the reaction was completed the resin was rinsed with DI water and filtered. This was the basement layer and the resin was further modified following five cycles of reactions. Each cycle is defined by a reaction with BDDGE (Add 1.32 g of BDDGE and 12 g of water to the resin, mix well and pursue reaction for 45 min @ 80° C.) followed by a DI water rinse and filtering, and a reaction with methyl amine (Add 1.32 g of methylamine and 12 g of water to the resin, mix well and pursue reaction for 45 min @ 80° C.) followed by a DI water rinse and filtering. After the five reaction cycles the resin was ready for packing.

Example 5

The fully synthesized resin as per the present invention from Example 3 labeled 'Phase A' for carboxylate phase (present invention) and 'Phase B' for sulfonate phase (as per U.S. Pat. No. 7,291,395) was used in this example to make exemplary columns. The substrate was wide-pore resin 6.14 µm diameter with a surface area of 20.5 $m^2/g$. The phase from example 3 was unpacked from the 9×250 mm column and rinsed and washed with 0.5 M NaOH and DI water and the process was repeated twice.

The columns were packed as follows: 1.8 g of resin A or B was added to 8 g of 0.5 M sodium carbonate and after mixing the resin well the columns (3×150 mm) were packed using standard methods using DI water as the packing solution at a temperature of 60° C. at a flow rate of 5.5 ml/min for 15 minutes. The columns were tested using an Ion chromatograph at a flow rate of 0.68 ml/min using an eluent comprising of 4.5 mM sodium carbonate and 1.5 mM sodium bicarbonate. The sample loop size was 2.5 µL.

| Peak No. | Sample | Conc (ppm) |
|----------|--------|------------|
| 1 | Fluoride | 5 |
| 2 | Chloride | 10 |
| 3 | Nitrite | 15 |
| 4 | Bromide | 25 |
| 5 | Nitrate | 25 |
| 6 | Phosphate | 40 |
| 7 | Sulfate | 30 |

Figure 2:
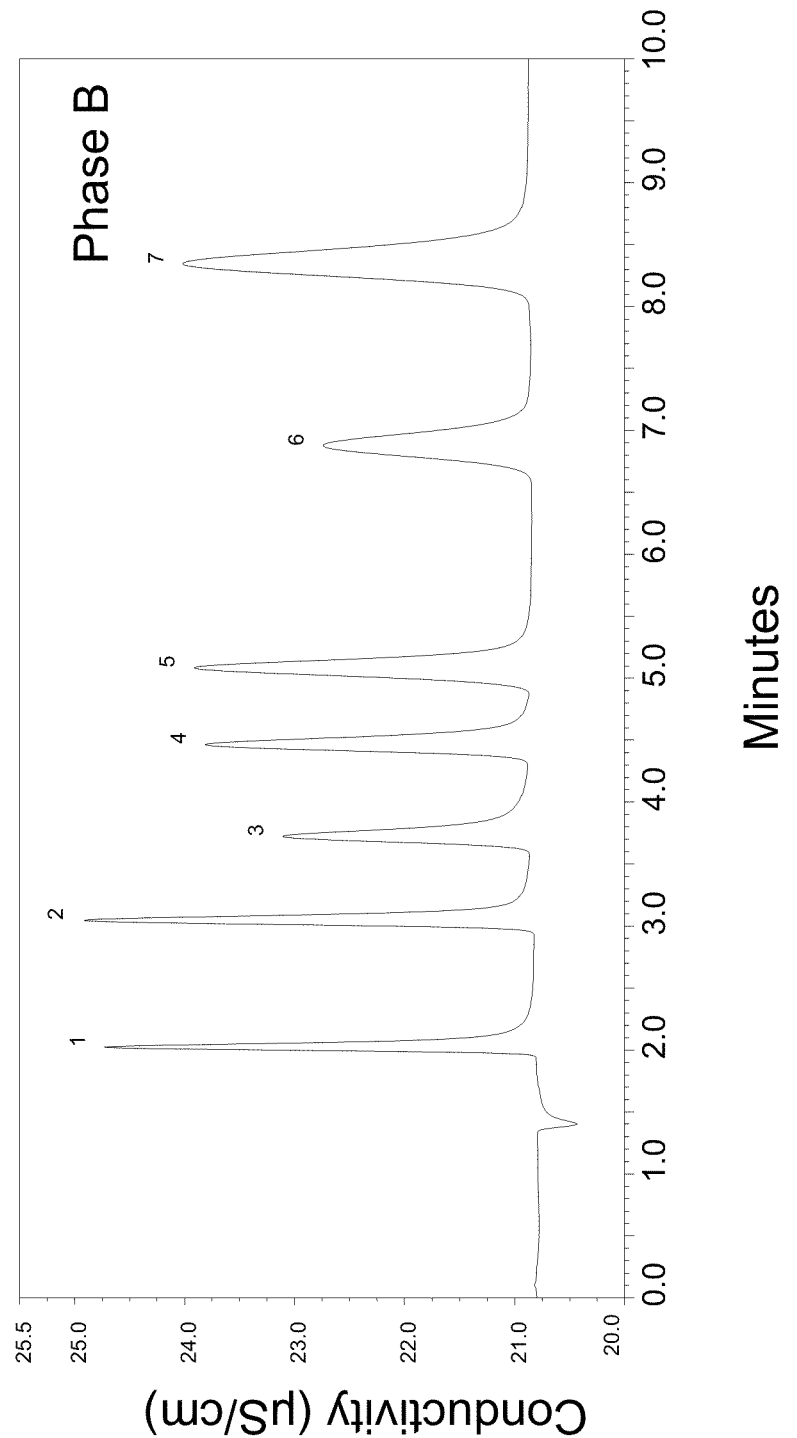
FIG. 2 is a chromatogram showing the ion chromatographic analysis of a mixture of seven anions using a wide pore sulfonated stationary phase prepared according to the methods of U.S. Pat. No. 7,291,395.

The chromatogram in FIG. 1 shows the analysis of the seven anions using the resin of phase A as per the present invention. FIG. 2 shows the corresponding analysis done on phase B with a sulfonated substrate, as per U.S. Pat. No. 7,291,395. Comparing the results, FIG. 1 shows the retention time of phosphate to be 20.26 minutes versus 6.88 minutes for phase B. Clearly the addition of the organic polymer layer in contact with the substrate as per the present invention provided a significant increase in capacity as evident from the 3-fold longer retention time on phase A. Further, the phosphate peak (peak labeled 6) eluted after sulfate (peak labeled 7) indicating a selectivity change in the new phase relative to phase B of the prior art. Typically only hydroxide chemistries exhibit this elution pattern. These results indicate superior performance of the present phase. A standard 4×250 mm version of this column is expected to show a very high capacity.

Example 6

Figure 3:
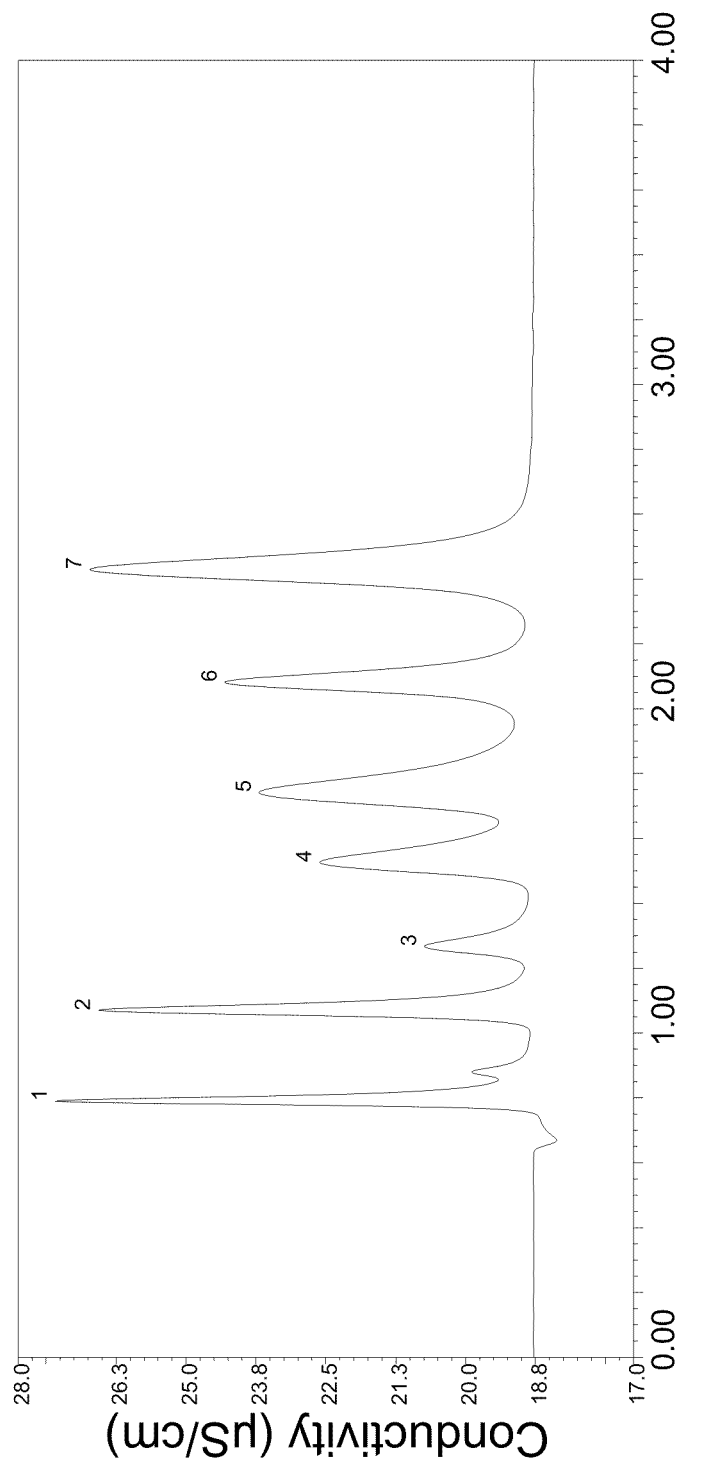
FIG. 3 is a chromatogram showing the ion chromatographic analysis of a mixture of seven anions using a microporous stationary phase of the present invention
Figure 4:
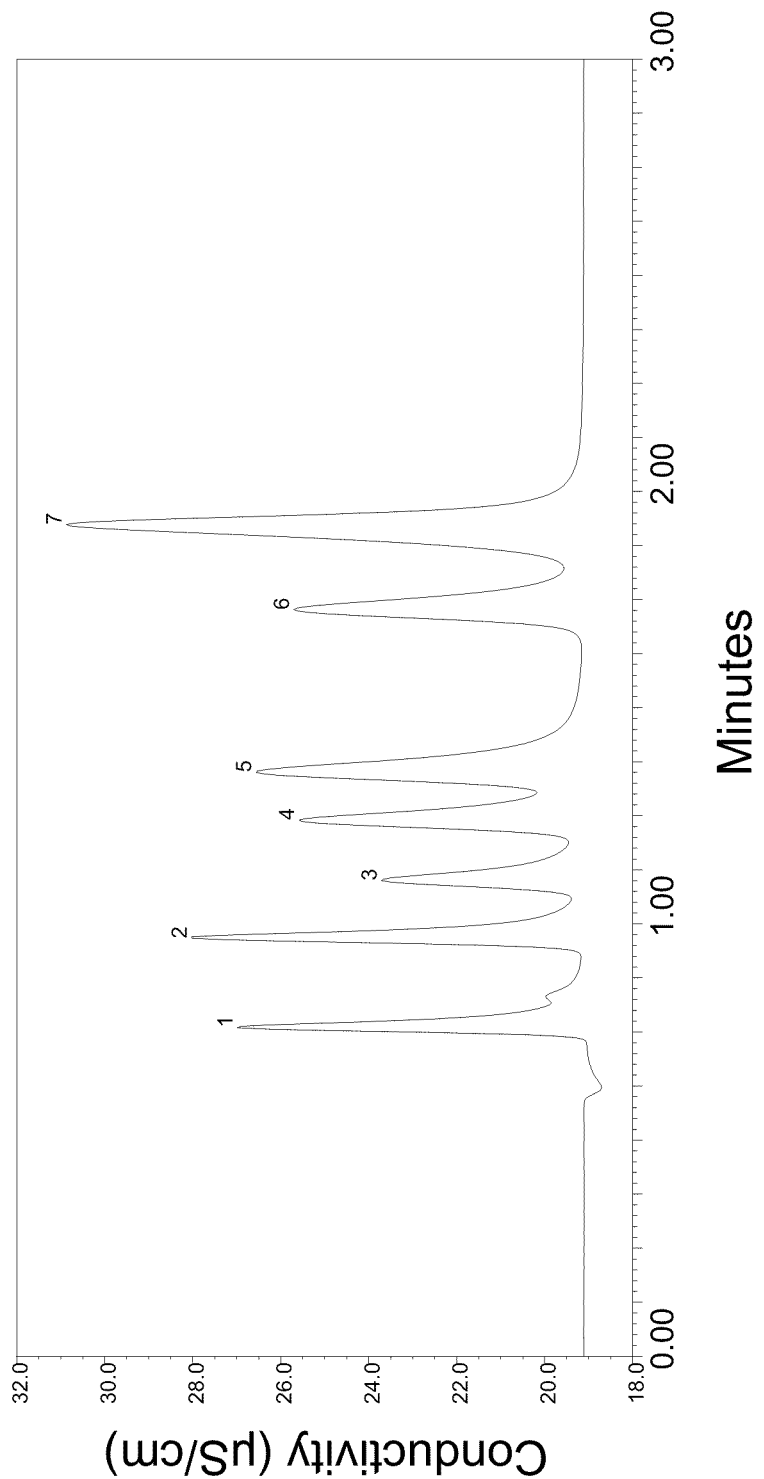
FIG. 4 is a chromatogram showing the ion chromatographic analysis of a mixture of seven anions using a microporous sulfonated stationary phase prepared according to the methods of U.S. Pat. No. 7,291,395

The fully synthesized resin as per the present invention from Example 3 labeled A for carboxylate phase (present invention) and B for sulfonate phase (as per U.S. Pat. No. 7,291,395) was used in this example to make exemplary columns. The substrate used in this example was a micro porous resin with a diameter of 6.5 μm. The columns were packed under conditions similar to those shown in Example 5 and tested under identical conditions. The chromatogram of FIG. 3 shows the analysis of the seven anions using the phase of the present invention phase A. FIG. 4 shows the corresponding analysis done on the sulfonated substrate phase of U.S. Pat. No. 7,291,395. Comparing the results, FIG. 3 shows the retention time of sulfate (Peak labeled 7) to be 2.43 minutes versus 1.92 minutes for phase of U.S. Pat. No. 7,291, 395 (FIG. 4). Without intending to be bound to a particular theory of operation, it is believed that, since the pores in the phase are not accessible, the increase in capacity as evident from retention time was relatively smaller as compared to the previous example with a wide pore substrate. Nevertheless the addition of a hydrophilic organic polymer layer in contact with the substrate resulted in an increase in capacity as per the present invention. The resolution of the shoulder peak (acetate) to fluoride (peak 1) is much better with the invention of the present phase. Further the resolution of phosphate and sulfate is better in the phase of the present invention (FIG. 3) versus the prior art phase (FIG. 4).

Example 7

Figure 5:
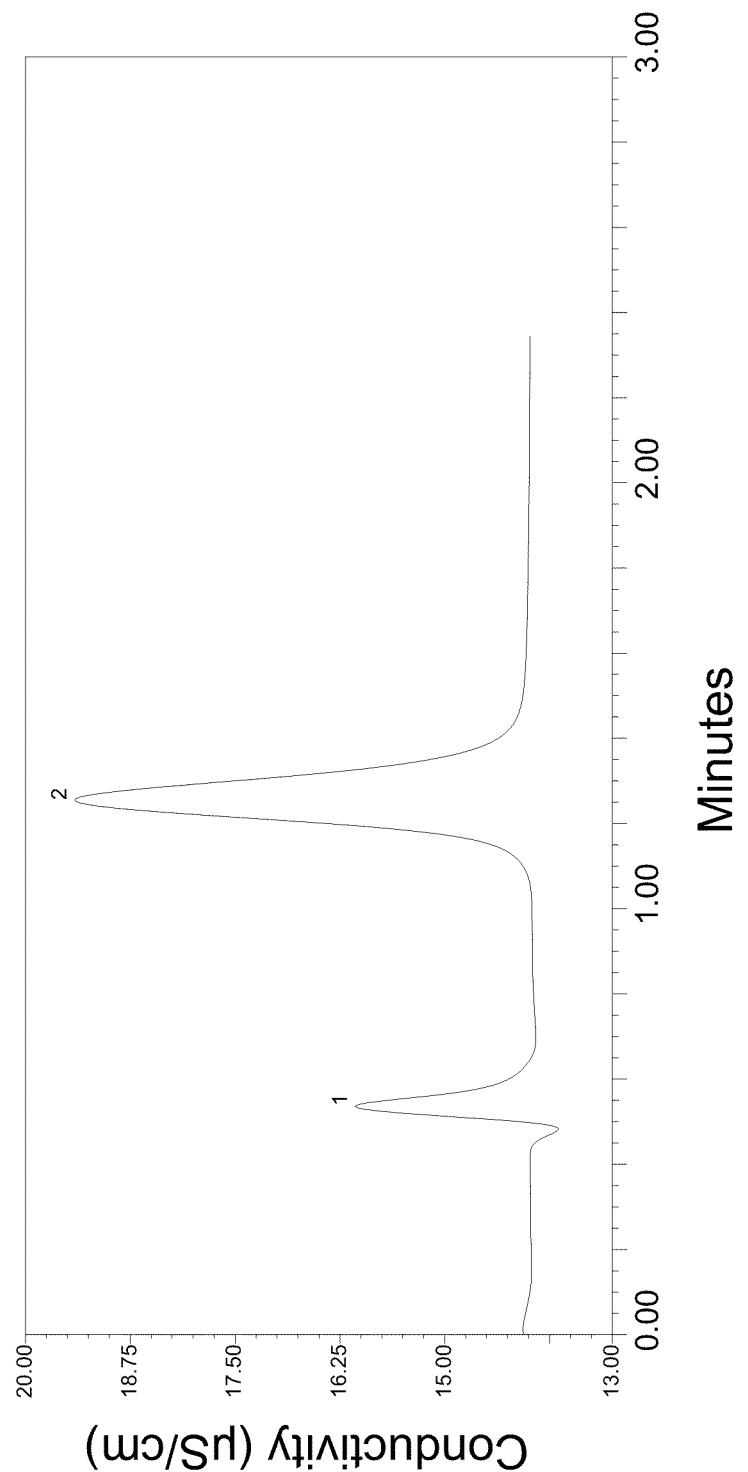
FIG. 5 is a chromatogram showing the ion chromatographic analysis of fluoride and sulfate using a wide pore stationary phase of the present invention following an in-vial synthesis.
Figure 6:
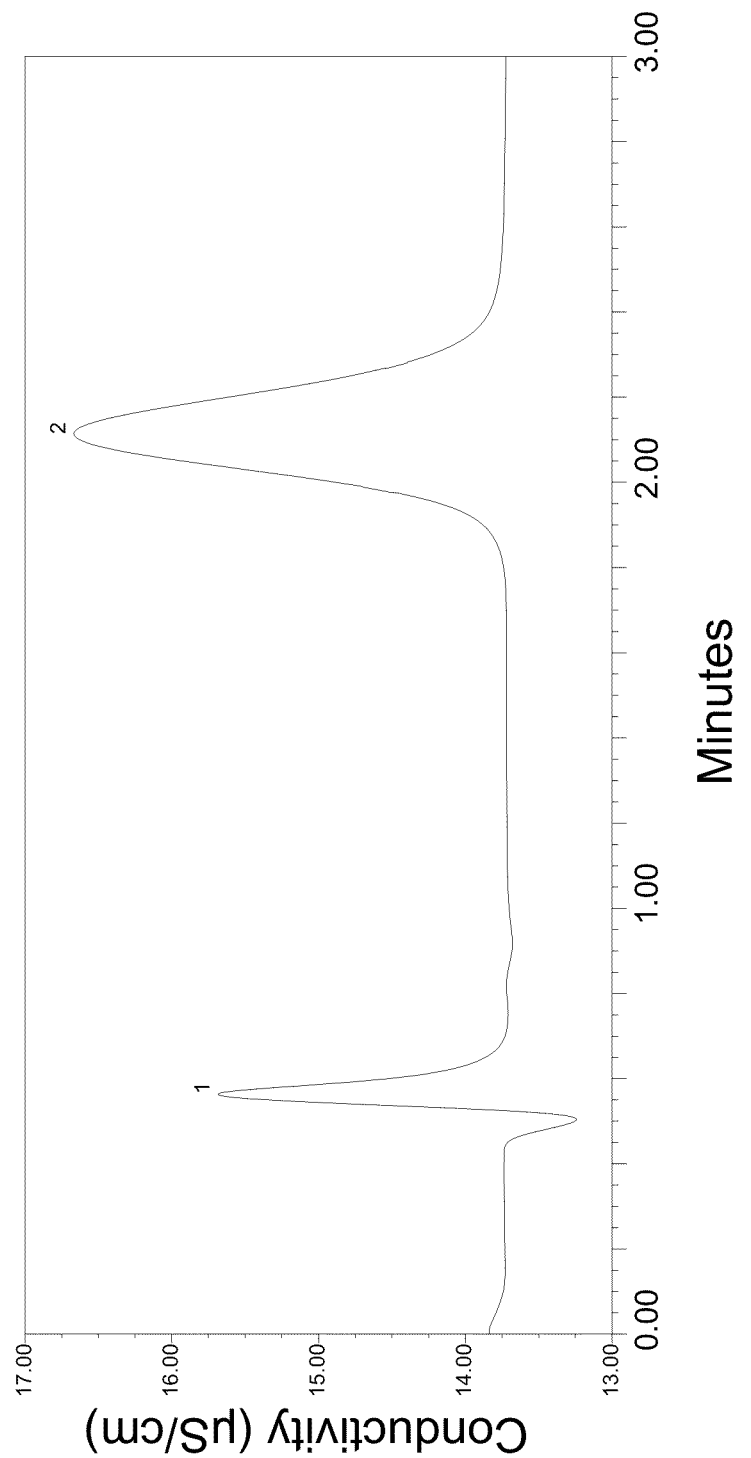
FIG. 6 is a chromatogram showing the ion chromatographic analysis of fluoride and sulfate using a wide pore stationary phase of the present invention following an in-vial synthesis. In this example the monomer concentration of the first polymer layer is approximately twice that of the material used to generate FIG. 5.

A resin from the in vial approach from Example 4 was used in this example. The packing conditions were similar to those used in Example 5. The weight of the resin was lowered by an amount proportional to the size of the column. The column in this case was 4×35 mm intended for a concentrator column format. The column was tested using a 9 mM sodium carbonate eluent at 1 mL/min and using fluoride (1 ppm) and sulfate (10 ppm) as test probes. FIG. 5 and FIG. 6 show phases synthesized as per the present invention with the exception that the acrylic acid monomer concentration was doubled in preparing the stationary phase used to generate the chromatogram of FIG. 6 versus the monomer concentration in the phase used to generate the chromatogram of FIG. 5.

Figure 7:
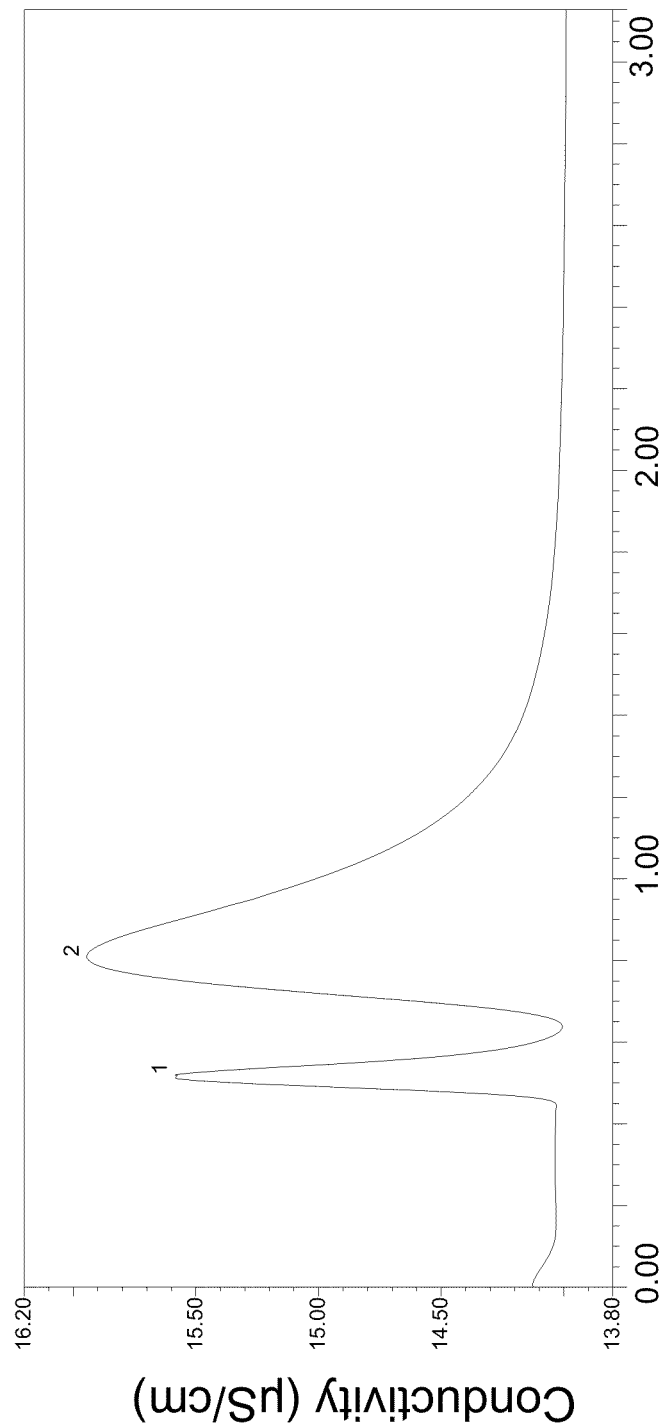
FIG. 7 is a chromatogram showing the ion chromatographic analysis of fluoride and sulfate using a wide pore sulfonated stationary phase prepared according to the methods of U.S. Pat. No. 7,291,395
Figure 8:
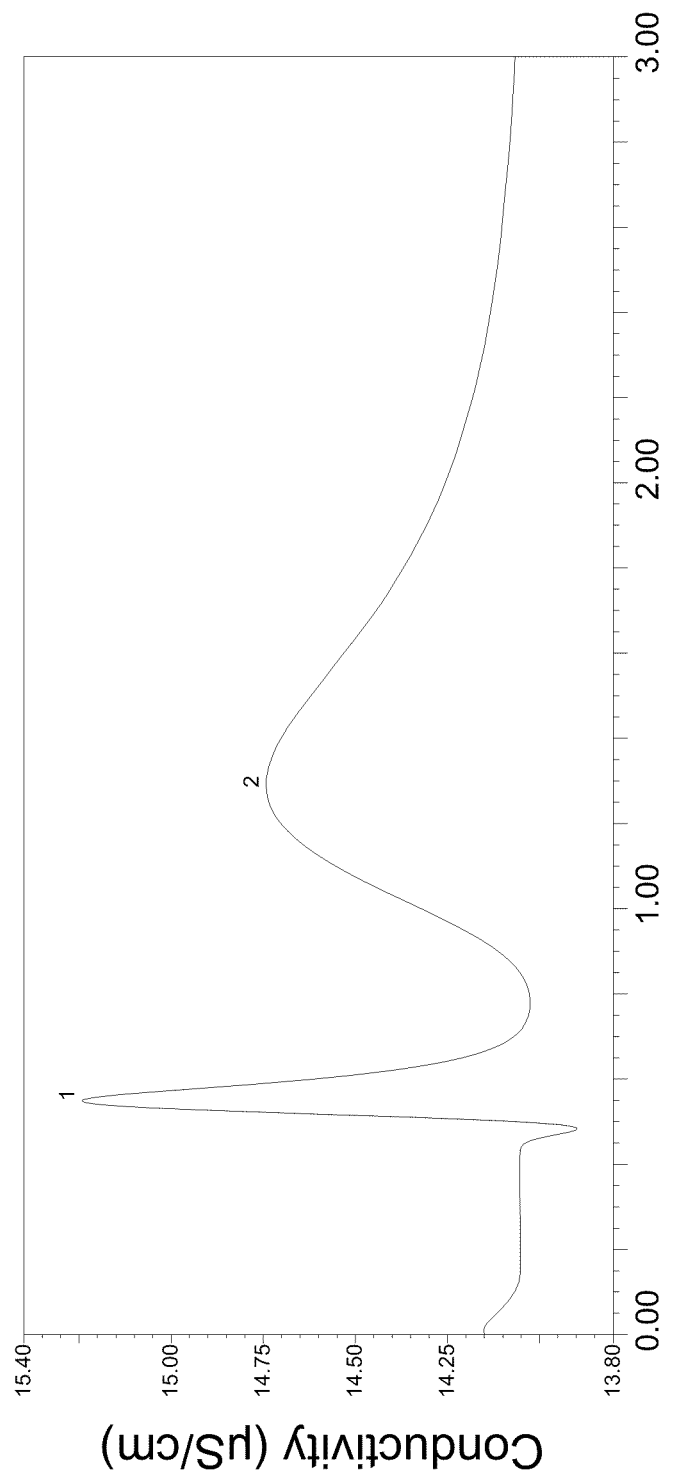
FIG. 8 is a chromatogram showing the ion chromatographic analysis of fluoride and sulfate using a wide pore sulfonated stationary phase prepared according to the methods of U.S. Pat. No. 7,291,395. The sulfonation was accomplished for a longer time and at a higher temperature relative to Example 7.

The sulfate retention time increased from 1.2 to 2.2 minutes. Without wishing to be bound to any single theory of operation, it is believed that the increase in retention time is due to increased chain length of the polymer on the substrate and improved coverage on the substrate upon doubling the quantity of monomer, which, in turn increased the number of anchor points for the additional polymer layer(s). FIG. 7 and FIG. 8 show the results obtained using a known sulfonated substrate of the prior art, the phase of FIG. 8 was sulfonated more aggressively (4 hours at 50° C. versus 1 hour at room temperature). Despite the sulfonation conditions a modest increase from 0.82 minutes to 1.3 minutes due to an increase in sulfonated charges on the surface was observed. However the peak shapes were non optimal and not suitable for chromatography or as a concentrator column. In contrast the peak shapes of the phase of the present invention were excellent as evident from FIG. 5 and FIG. 6. It should be noted that the capacity of the phase of the present invention (FIG. 6) was significantly higher than the sulfonated substrate phase of (FIG. 8) based on the 2-fold increase in retention time for sulfate.

Example 8

Figure 9:
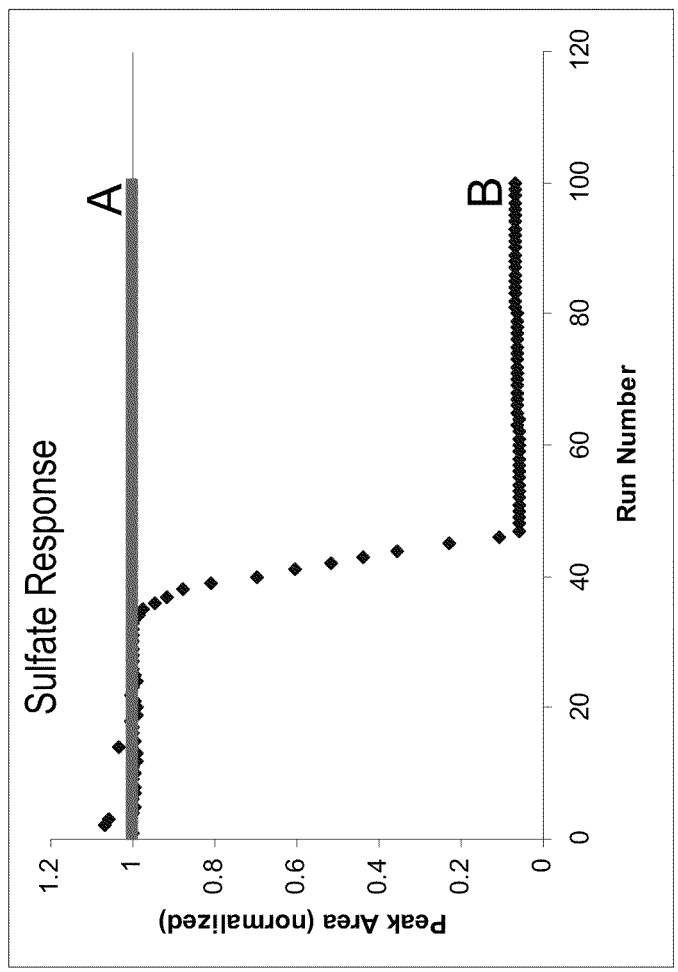
FIG. 9 is an excel sheet showing a plot of the peak area versus run number for a sulfate sample in a polyacrylic acid matrix. A stationary phase of the present invention was used as a concentrator column (Trace A) versus a commercial product (Trace B) from Dionex Corporation.

The column of chromatography medium of the present invention from Example 7 was used as a concentrator column in this example labeled 'A' and compared to a commercial guard column product labeled 'B' from Dionex Corporation, Sunnyvale, Calif. The columns were installed in the injection loop of an ion chromatograph and 10 mL of a sample was preconcentrated in the column. The sample comprised of polyacrylic acid polymer matrix with a spiked amount of 2 mg/L of chloride, sulfate and nitrate. Analysis was performed using a 4×250 mm IonPac AS15 column with 38 mM sodium hydroxide eluent at a flow rate of 1.2 mL/min at 30° C. A 4 mm ASRS 300 suppressor was used with an applied current of 113 mA. The results showed that the commercial guard column did not fare well as a concentrator column with the polyacrylic acid matrix and only a few runs were possible before the concentrator column was overwhelmed by the matrix. This effect can be observed in trace B as a drop in peak area response after about 40 runs. In contrast the concentrator column 'A' of the present invention did not show such effects and showed excellent performance with this matrix as shown in FIG. 9.

Example 9

In this example the polymer substrate was coated with vinyl benzyl chloride polymer. 1.02 g of the substrate resin with wide pore was mixed in a scintillation vial with 3.736 g of acetone, 1.087 g of vinylbenzylchloride monomer and 0.097 g of AIBN (initiator) and placed in a tumbler in an oven at 65° C. and allowed to react for four hours. The product was a vinylbenzylchloride polymer coated substrate and was washed with acetone and then water containing 5% Triton X405 as a wetting agent. The resin was packed into a 4×250 mm column body starting with an 8 mL per minute flow rate for the first two minutes. When the pressure rose to 5200 pounds per square inch the flow rate was decreased to 2.5 mL per minute. Packing continued for 26 more minutes at this flow rate. The flow rate was then increased to 4 mL per minute for the last two minutes of the packing process. The column was then removed from the packing station, the inlet fitting was attached to the column body and the column was placed in a 70° C. water bath while connected to an HPLC pump. For the first 10 minutes, a solution containing 7.2% butandioldiglycidyl ether and 1.12% methyl amine dissolved in water was pumped through the column at 0.5 mL per minute. The flow was then stopped and the mixture was allowed polymerized in the column for another 50 minutes. The amine is expected to react with the epoxide and with the chloride on the polymer substrate thus anchoring the linear polymer onto the substrate by covalent means. The flow was resumed at 0.5 mL per minute and the column was rinsed for five minutes with deionized water. Following this, 10% butandioldiglycidyl ether dissolved in water was pumped through the column for 10 minutes at 0.5 mL per minute. Flow was then stopped and the butandioldiglycidyl ether was allowed to react with the packing material in the column for another 20 minutes. The flow was resumed at 0.5 mL per minute and the column was rinsed for five minutes with deionized water. Following this, an aqueous solution of 4% methyl amine was pumped through the column for 10 minutes and then flow was stopped to allow the methyl amine to react with the stationary phase for another 20 minutes. The flow was resumed at 0.5 mL per minute and the column was rinsed for five minutes with deionized water. Following this, 10% butandioldiglycidyl ether dissolved in water was pumped through the column for 10 minutes at 0.5 mL per minute. Flow was then stopped and the butandioldiglycidyl ether was allowed to react with the packing material in the column for another 20 minutes. The flow was resumed at 0.5 mL per minute and the column was rinsed for five minutes with deionized water. Following this, an aqueous solution of 4% methyl amine was pumped through the column for 10 minutes and then flow was stopped to allow the methyl amine to react with the stationary phase for another 20 minutes. The flow was resumed at 0.5 mL per minute and the column was rinsed for 30 minutes with deionized water. The column was tested and found to have anion retention properties. Using 20 millimolar potassium hydroxide at 1 mL per minute a sample mixture containing fluoride, chloride, nitrite, bromide, and nitrate were separated. Nitrate had a retention time of 10.9 minutes.

Example 10

The technique of Example 3 is used for forming component A. The agglomerates are formed by making a slurry of such component A material in a suitable solvent, preferably deionized water, to produce a particle slurry. The second, separate slurry, e.g., a batch of a carboxylate polymer coated resin as per Example 1 not exposed to the epoxy monomer and primary amine condensation product are added dropwise to the primary particle slurry (component A) while the slurry is stirred to provide the aggregated or agglomerated polymer particle. Such aggregated polymer particles are then packed into a column and used as is. The agglomerate of components A and B formed in this manner are then coated with a condensation polymer formed in situ from the reaction of epoxy monomer with a primary amine (of the same type as described above). The coating process is ended or the coating is treated with solutions of epoxy monomer followed by solutions of primary amine. The sequence can be repeated to form a suitable anion exchange phase. The coating provides a way of additionally agglomerating or gluing the resin particles together as well as increasing the ion exchange capacity of the aggregated bed.

Example 11

A mixture is prepared using 0.53 g of the particles from Example 3 together with 2.99 g of a solution composed of 932 g of water, 5 g of Igebal CO-630 (an ethoxylated alkylphenol nonionic surfactant), 50 g of acetic acid and 13 g of ethylene diamine. Separately, 0.52 g of sulfonated particles are slurried with 2.09 g of the above mentioned slurry solution and mixed. Following this, the mixture of particles from Example 1 is slowly added to the mixture of sulfonated particles from while being vigorously stirred using a magnetic stirrer. The resulting mixture is then packed into a 2 mm by 250 mm column body at 2.5 ml per minute and 65° C. for 15 minutes. The column is then removed from the column packing adapter, the top end fitting installed in the packed column placed in a 65° C. water bath. Following this, the packed column is then placed in a 65° C. water bath while a mixture containing 7.2% (by weight) 1,4-butanedioldiglycidylether and 1.12% methylamine (by weight) is pumped through the column for 30 minutes at 0.1 ml per minute. Without interrupting the flow, a solution containing 10% (by weight) 1,4-butanedioldiglycidylether is passed through the column for another 30 minutes. Following that, without interrupting the flow, a solution containing 4% (by weight) methylamine is passed through the column for another 30 minutes. The last two steps are repeated for two additional reaction cycles for a total of 120 additional minutes. The column is then rinsed with deionized water for 15 minutes before being removed from the water bath. The resulting column is ready for chromatographic evaluation. The column is expected to provide an exceptionally low pressure for the particle size used to prepare the column, of the order of about 700 psi when operated at 0.25 ml min at 30° C. using a 30 mM potassium hydroxide eluent.

Example 12

The column from Example 11 is returned to the 65° C. water bath for addition of another layer of condensation polymer. A solution containing 10% (by weight) butanedioldiglycidylether is passed through the column for 30 minutes at 0.1 ml per minute. Following that, without interrupting the flow, a solution containing 4% (by weight) methylamine is passed through the column for another 30 minutes. The column is then rinsed with deionized water for 15 minutes before being removed from the water bath. The resulting column is then placed on an ion chromatographic and reevaluated for chromatographic performance. The column is expected to continue to exhibit exceptionally low-pressure (of the order of 700 psi when operated at 0.25 ml per minute and 30° C. with 30 mM potassium hydroxide eluent). The column efficiency is essentially unaffected by the additional coating step but the retention time for nitrate is expected to increase, indicating successful addition of another layer of condensation polymer.

Although the invention has been described in terms of specific embodiments and applications, persons skilled in the art can, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof. All patent and literature references are incorporated herein by reference in their entirety for all purposes.

What is claimed is:

1. An ion exchange medium formed by a method comprising
   (a) attaching a first polymer layer to a substrate, wherein the first polymer layer comprises reactive functional groups that are accessible to an incoming reactive monomer or polymer thereby comprising multiple anchor points on organic polymer chains of the first polymer layer to attach one or more condensation polymers to the substrate, by a method which is a member selected from the group of:
      (i) polymerizing at least a first polymerizable monomer, having a functional group which is a member selected from a reactive functional group and a charged functional group, in contact with the substrate; and
      (ii) attaching an intact polymer having a functional group which is a member selected from a reactive functional group and a charged functional group
      thereby attaching the first polymer layer to the substrate, forming a polymer coated substrate, said polymer comprising said functional group wherein the first polymer layer is a polymer other than one formed by a condensation polymerization;
   (b) reacting with the functional groups that are accessible to the incoming reactive monomer or polymer a compound which is a member selected from:
      (i) at least a first amine compound comprising a first reactive nitrogen group which is a member selected from the group consisting of ammonia, a primary and a secondary amine;
      (ii) at least a first polyfunctional compound, having at least two first reactive functional groups reactive with the first reactive nitrogen group; and
      (iii) a combination thereof,
      thereby forming a first condensation polymer reaction product, and (c) reacting the first condensation polymer reaction product with a member selected from:
  (i) at least a second amine compound comprising a second reactive nitrogen group which is a member selected from the group consisting of ammonia, a primary, and a secondary amine when a reactive functional group derived from a polyfunctional compound is present in the first condensation polymer product, and
  (ii) at least a second polyfunctional compound, having at least two second reactive functional groups reactive with the first reactive nitrogen group when the first reactive nitrogen group is present in the first condensation polymer; and
  (iii) a combination thereof,
  thereby forming a second condensation polymer reaction product, and
(d) reacting the second condensation polymer with a member selected from:
  (i) at least a third amine compound, comprising a third reactive nitrogen group, which is a member selected from the group consisting of ammonia, a primary, a secondary, and a tertiary amine when a reactive functional group derived from a polyfunctional compound is present in the second condensation polymer product;
  (ii) at least a third polyfunctional compound, having at least two third reactive functional groups reactive with the second reactive nitrogen group when the second reactive nitrogen group is present in the second condensation polymer; and
  (iii) a combination thereof,
  thereby forming a third condensation polymer reaction product.

2. The ion exchange medium of claim 1 further comprising an electrostatically aggregated ion exchange medium formed by the method of contacting the ion exchange medium with a second ion exchange medium having an opposite charge.

3. The ion exchange medium of claim 1, wherein the first polymer layer is formed from a polymerizable monomer comprising a vinyl group containing monomer.

4. The ion exchange medium of claim 3, wherein the vinyl group containing monomer is acrylic acid.

5. The ion exchange medium of claim 1, wherein the first polymer layer is formed from an intact polymer comprising a vinyl group containing polymer.

6. The ion exchange medium of claim 5, wherein the vinyl group containing polymer is a polyacrylic acid.

7. An ion exchange medium comprising,
  a coated substrate having a first polymer layer attached thereto wherein the first polymer layer is a polymer other than one formed by a condensation polymerization, wherein the first polymer layer comprises multiple anchor points on organic polymer chains of the first polymer layer attaching one or more condensation polymers to the first polymer layer,
  a second polymer layer attached to the first polymer layer in which the second polymer layer comprises at least a first condensation polymer reaction product of at least a first amine compound, comprising a reactive nitrogen group, selected from the group consisting of ammonia, a primary and a secondary amine, and at least a first polyfunctional compound with at least two functional reactive functional groups reactive with the reactive nitrogen groups,
  a second condensation polymer reaction product attached to the first condensation polymerization reaction product, said second condensation polymerization product comprising the reaction product between at least a second polyfunctional compound and at least a second amine compound,
  a third condensation polymer reaction product attached to the second condensation polymerization reaction product, said third condensation polymerization product comprising the reaction product between at least a third polyfunctional compound and at least a third amine compound.

8. The ion exchange medium of claim 7 in which the two functional moieties of the first and second polyfunctional compound include at least one functional moiety selected from the group consisting of epoxide, alkyl halides, benzylhalides, tosylates, methylsulfides, and mixtures thereof.

9. The ion exchange medium of claim 7 in which the substrate comprises a flow-through monolithic medium.

10. The ion exchange medium of claim 7 in which the at least one of the two functional moieties of the first, second, and third polyfunctional compounds comprise epoxide moieties.

11. The ion exchange medium of claim 7 comprising a member selected from cationic functional groups, anionic functional groups and a combination thereof.

12. The ion exchange medium of claim 7 in which the substrate has a surface comprising an organic polymer.

13. The ion exchange medium of claim 7 in which a condensation polymer of said medium is cross-linked.

14. The ion exchange medium of claim 7 in which a condensation polymer of said medium includes branched polymer chains.

15. The ion exchange medium of claim 7 in which the first polymer layer comprises a hydrophilic functional group which is a member selected from the group consisting of carboxylate, sulfonate, iminodiacetate, halide, amine, hydroxyl, epoxide and a combination thereof.

16. The ion exchange medium of claim 7 in which the first polymer layer is formed from a polymerizable monomer comprising a vinyl group containing monomer.

17. The ion exchange medium of claim 16 in which the vinyl group containing monomer is acrylic acid.

18. The ion exchange medium of claim 7, wherein the first polymer layer is formed from an intact polymer comprising a vinyl group containing polymer.

19. The ion exchange medium of claim 18, wherein the vinyl group containing polymer is a polyacrylic acid.

* * * * *

UNITED STATES PATENT AND TRADEMARK OFFICE
CERTIFICATE OF CORRECTION

PATENT NO. : 9,132,364 B2  
APPLICATION NO. : 12/714253  
DATED : September 15, 2015  
INVENTOR(S) : Kannan Srinivasan et al.

Page 1 of 1

It is certified that error appears in the above-identified patent and that said Letters Patent is hereby corrected as shown below:

On the Title page, item (54) and in the Specification, in column 1, line 2, in the title, please replace "PHASES" with --PHASE--.

Signed and Sealed this  
Twenty-third Day of August, 2016

Michelle K. Lee  
*Director of the United States Patent and Trademark Office*